US011859419B2

(12) United States Patent
Chen et al.

(10) Patent No.: US 11,859,419 B2
(45) Date of Patent: Jan. 2, 2024

(54) HANDLE SYSTEM FOR A VEHICLE AND CONTROL METHOD THEREOF

(71) Applicant: Illinois Tool Works Inc., Glenview, IL (US)

(72) Inventors: Bin Chen, Shanghai (CN); Wenquan Sha, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 888 days.

(21) Appl. No.: 16/575,024

(22) Filed: Sep. 18, 2019

(65) Prior Publication Data

US 2020/0087955 A1 Mar. 19, 2020

(30) Foreign Application Priority Data

Sep. 19, 2018 (CN) ......................... 201811094976.4
Sep. 9, 2019 (CN) ......................... 201910848844.4

(51) Int. Cl.
*E05B 85/10* (2014.01)
*E05B 81/76* (2014.01)

(52) U.S. Cl.
CPC ............ *E05B 85/107* (2013.01); *E05B 81/76* (2013.01); *E05B 85/103* (2013.01)

(58) Field of Classification Search
CPC .......... E05B 81/64; E05B 81/76; E05B 81/77; E05B 85/10; Y10S 292/31
See application file for complete search history.

(56) References Cited

U.S. PATENT DOCUMENTS 6,698,262 B2 * 3/2004 Wittwer .................. E05B 77/34 292/DIG. 31
7,621,573 B2 * 11/2009 Thomas ................ E05B 85/107 49/501
8,690,204 B2 * 4/2014 Lang ..................... E05B 85/107 292/DIG. 31

(Continued)

FOREIGN PATENT DOCUMENTS

CN 102191877 A 9/2011
CN 102747893 A 10/2012

(Continued)

OTHER PUBLICATIONS

First Office Action from related Chinese Patent Application No. 201910848844.4 dated Feb. 18, 2022 (22 pages) (English translation included).

*Primary Examiner* — Carlos Lugo
(74) *Attorney, Agent, or Firm* — Quarles & Brady LLP

(57) ABSTRACT

A handle system for a vehicle and a control method for the handle system includes a handle body, a touch sensing device and a controller. The touch sensing device includes one or more sensing circuits. The handle body is arranged on a vehicle door, and the touch sensing device is arranged in or on the handle body and is capable of generating a corresponding sensing signal in response to a touch on the handle body. The controller is capable of generating a corresponding control signal according to the sensing signal, and controlling, according to the control signal, a handle driving device. The handle driving device drives the deploying or retracting of the handle body, and performs activation, locking and other control operations on a vehicle.

17 Claims, 13 Drawing Sheets

(56) References Cited

U.S. PATENT DOCUMENTS

| | | | | |
|---|---|---|---|---|
| 8,701,353 | B2 * | 4/2014 | Patel | E05B 85/103<br>292/201 |
| 9,062,478 | B2 * | 6/2015 | Bingle | E05B 85/107 |
| 9,605,452 | B2 * | 3/2017 | Yoshino | E05B 85/107 |
| 10,167,656 | B2 * | 1/2019 | Park | E05B 85/107 |
| 10,280,658 | B2 * | 5/2019 | Halliwell | E05B 85/107 |
| 2008/0163555 | A1 * | 7/2008 | Thomas | E05B 85/01<br>292/336.3 |
| 2016/0222702 | A1 * | 8/2016 | Koizumi | E05B 81/64 |
| 2016/0222703 | A1 * | 8/2016 | Koizumi | E05B 81/77 |
| 2016/0298366 | A1 * | 10/2016 | Och | E05B 85/103 |

FOREIGN PATENT DOCUMENTS

| | | | | |
|---|---|---|---|---|
| CN | 102767317 | A | 11/2012 | |
| CN | 102844512 | A | 12/2012 | |
| CN | 203465769 | U | 3/2014 | |
| CN | 104428680 | A | 3/2015 | |
| CN | 105089382 | A | 11/2015 | |
| CN | 205603004 | U | 9/2016 | |
| CN | 106338772 | A | 1/2017 | |
| CN | 108474221 | A | 8/2018 | |
| CN | 108533100 | A | 9/2018 | |
| CN | 109958348 | A | 7/2019 | |
| DE | 102013212083 | A1 | 1/2014 | |
| DE | 102014222412 | A1 * | 5/2016 | E05B 81/77 |
| DE | 102016112689 | A1 * | 1/2018 | E05B 81/76 |
| DE | 102016124037 | A1 * | 6/2018 | B60R 25/245 |
| KR | 20180092108 | A | 8/2018 | |
| WO | WO-2007003632 | A1 * | 1/2007 | E05B 81/78 |

* cited by examiner

HANDLE SYSTEM FOR A VEHICLE AND CONTROL METHOD THEREOF

RELATED APPLICATIONS

This application claims the benefit of Chinese Patent Application No. 201811094976.4, filed Sep. 19, 2018, and Chinese Patent Application No. 201910848844.4, filed Sep. 9, 2019, which are hereby incorporated by reference in their entirety.

TECHNICAL FIELD

The present disclosure relates to a handle system, and in particular to a hidden type handle system for a vehicle and a control method thereof.

BACKGROUND

In most existing vehicles, handles are often arranged to protrude from the surface of the vehicle body, and there is a space between the handle and the surface of the vehicle body that can accommodate a hand. When the vehicle door needs to be opened, a user extends his/her hand into the space and pulls the handle to open the vehicle door. However, the protruding handle tends to collide with other items or people, which causes damages to the handle and shortens the service life thereof. The protruding handle also adds extra wind resistance when the vehicle is driving.

Therefore, a hidden type handle system is used in some existing vehicles, which has an outer surface that can be substantially flush with the vehicle door surface, such that the entire vehicle body surface is flat. This can not only prevent the handle from being collided because of protruding from the surface, but also can reduce wind resistance when the vehicle is moving.

SUMMARY

The object of the present disclosure is to provide a hidden type handle system for a vehicle and a control method for the handle system, which can operate and control the handle system by means of touch sensing, and is more flexible and convenient than the conventional operation manners.

According to a first aspect of the present disclosure, the present disclosure provides a handle system for a vehicle, comprising: a handle body having an deployed position and a retracted position; a touch sensing device being arranged in or on the handle body and being capable of generating a sensing signal in response to a touch on the handle body, wherein the sensing signal can be used to drive the handle body from the deployed position to the retracted position, or to drive the handle body from the retracted position to the deployed position; and a controller configured to drive the handle body from the retracted position to the deployed position, or drive the handle body from the deployed position to the retracted position according to the sensing signal.

The handle system according to the first aspect of the present disclosure, the controller is configured to be activated by the sensing signal after receiving the sensing signal.

The handle system according to the first aspect of the present disclosure, the controller is configured to control the locking of a vehicle door according to the sensing signal.

The handle system according to the first aspect of the present disclosure, the touch sensing device comprises: an outer-side sensing circuit and an inner-side sensing circuit configured to respectively generate an outer-side sensing signal and an inner-side sensing signal in response to a touch action on an outer-side surface and an inner-side surface of the handle body. The controller is configured to generate, according to the received outer-side sensing signal and/or the inner-side sensing signal, a control signal by which the handle body is driven from the retracted position to the deployed position, or the handle body is driven from the deployed position to the retracted position.

The handle system according to the first aspect of the present disclosure, the controller is configured to drive the handle body from the retracted position to the deployed position when only the outer-side sensing signal is received; and the controller is configured to drive the handle body from the deployed position to the retracted position when the outer-side sensing signal and the inner-side sensing signal are received and then both of the outer-side sensing signal and the inner-side sensing signal cease.

The handle system according to the first aspect of the present disclosure, the outer-side sensing circuit comprises a first capacitive sensor, a first measurement circuit, a first comparison circuit and a first processor connected in sequence, wherein the first capacitive sensor is capable of generating a change in capacitance in response to a touch on the outer-side surface of the handle body, the first measurement circuit is configured to generate a first electrical signal according to the change in capacitance of the first capacitive sensor, the first comparison circuit is configured to compare the first electrical signal with a preset first threshold to generate a first comparison signal, and the first processor is configured to generate the outer-side sensing signal according to the first comparison signal. The inner-side sensing circuit comprises a second capacitive sensor, a second measurement circuit, a second comparison circuit and a second processor connected in sequence, wherein the second capacitive sensor is capable of generating a change in capacitance in response to a touch on the inner-side surface of the handle body, the second measurement circuit is configured to generate a second electrical signal according to the change in capacitance of the second capacitive sensor, the second comparison circuit is configured to compare the second electrical signal with a preset second threshold to generate a second comparison signal, and the second processor is configured to generate the inner-side sensing signal according to the second comparison signal.

The handle system according to the first aspect of the present disclosure, the touch sensing device further comprises a first filter circuit and a second filter circuit configured to perform filter processing on the sensing signals generated by the outer-side sensing circuit and the inner-side sensing circuit, respectively.

The handle system according to the first aspect of the present disclosure, the touch sensing device comprises a touch-slide type sensing circuit configured to respectively generate a first-direction touch-slide sensing signal and a second-direction touch-slide sensing signal in responsive to a sliding touch action on the outer-side surface of the handle body in a first direction and a second direction. The controller is configured to generate a first-direction control signal according to the received first-direction touch-slide sensing signal, and drive the handle body from the retracted position to the deployed position according to the first-direction control signal, or generate a second-direction control signal according to the received second-direction touch-slide sensing signal, and drive the handle body from the deployed position to the retracted position according to the second-direction control signal.

The handle system according to the first aspect of the present disclosure, the touch-slide type sensing circuit comprises: a third capacitive sensor, a third measurement circuit and a third comparison circuit connected in sequence, wherein the third capacitive sensor is capable of generating a change in capacitance in response to a touch on the outer-side surface of the handle body, the third measurement circuit is configured to generate a third electrical signal according to the change in capacitance of the third capacitive sensor, and the third comparison circuit is configured to compare the third electrical signal with a preset third threshold to generate a third comparison signal. The touch-slide type sensing circuit further comprises a fourth capacitive sensor, a fourth measurement circuit and a fourth comparison circuit connected in sequence, wherein the fourth capacitive sensor is capable of generating a change in capacitance in response to a touch on the outer-side surface of the handle body, the fourth measurement circuit is configured to generate a fourth electrical signal according to the change in capacitance of the fourth capacitive sensor, and the fourth comparison circuit is configured to compare the fourth electrical signal with a preset fourth threshold to generate a fourth comparison signal. The touch-slide type sensing circuit further comprises a third processor connected to the third comparison circuit and the fourth comparison circuit, wherein the third processor is configured to generate the first-direction sensing signal and the second-direction sensing signal according to an order of generating the third comparison signal and the fourth comparison signal.

The handle system according to the first aspect of the present disclosure, the touch sensing device further comprises a third filter circuit configured to perform filter processing on the touch-slide sensing signals generated by the touch-slide type sensing circuit.

The handle system according to the first aspect of the present disclosure, the handle body is configured to only expose its outer-side surface outside the vehicle body when the handle body is at the retracted position.

According to a second aspect of the present disclosure, the present disclosure provides a method for controlling a handle body of a vehicle, comprising the following steps: generating an outer-side sensing signal when an outer-side surface of the handle body is touched; controlling the deploying of the handle body and activating the vehicle according to the outer-side sensing signal; generating an outer-side sensing signal and an inner-side sensing signal and then both of the outer-side sensing signal and the inner-side sensing signal ceasing when the handle body is hold and then released; and controlling the retracting of the handle body and controlling the locking of a vehicle door upon the cessation of the outer-side sensing signal and the inner-side sensing signal.

The method according the second aspect of the present disclosure, further comprising the following step: after the outer-side sensing signal is generated, determining whether the handle is at a retracted position, and if so, executing the step of controlling the deploying of the handle body.

According to a third aspect of the present disclosure, the present disclosure provides a method for controlling a handle body of a vehicle, comprising the following steps: generating a first-direction touch-slide sensing signal when the handle body is slidably touched in a first direction; controlling the deploying of the handle body and activating the vehicle according to the first-direction touch-slide sensing signal; generating a second-direction touch-slide sensing signal when the handle body is slidably touched in a second direction; and controlling the retracting of the handle body and controlling the locking of a vehicle door according to the second-direction touch-slide sensing signal.

The control method according to the third aspect of the present disclosure, further comprising the following steps: determining whether the handle body is at a retracted position after the first-direction touch-slide sensing signal is generated, and if so, executing the step of controlling the deploying of the handle body; and determining whether the handle body is at a deployed position after the second-direction touch-slide sensing signal is generated, and if so, executing the step of controlling the retracting of the handle body.

According to a fourth aspect of the present disclosure, the present disclosure provides a vehicle comprising the handle system according to the first aspect.

The concept, specific structure and resulting technical effect of the present invention are further described below in conjunction with the drawings to fully understand the object, features and effects of the present invention.

BRIEF DESCRIPTION OF THE DRAWINGS

The present disclosure will become more easily understood when reading the following detailed description in conjunction with the accompanying drawings, throughout the drawings, like reference numbers represent like parts, in the drawings.

DETAILED DESCRIPTION

Figure 1A:
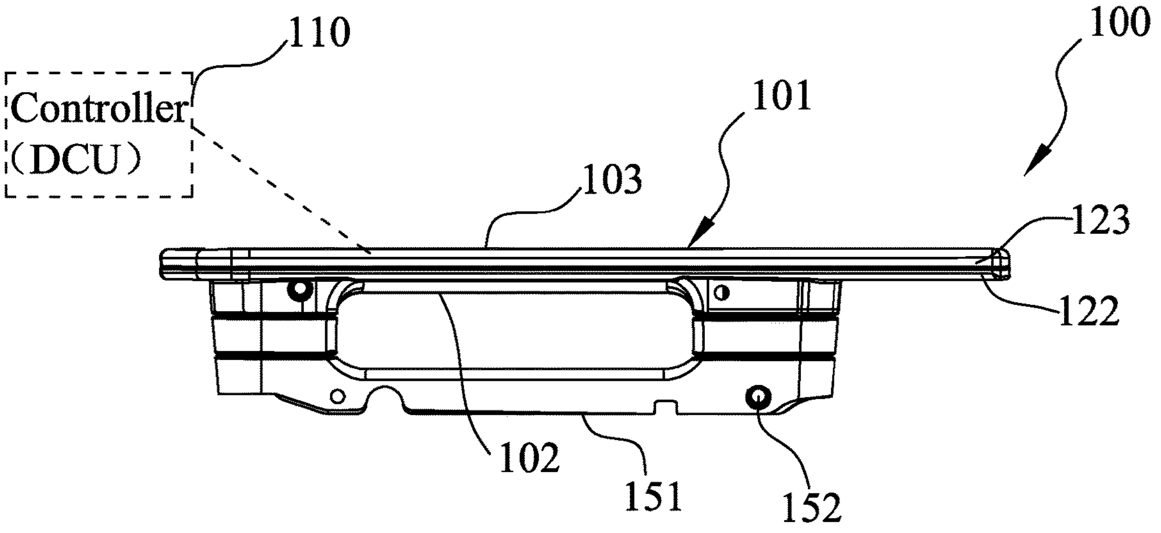
FIG. 1A shows an overall structure of a handle system according to one embodiment of the present disclosure, showing a handle body from one perspective.

The present disclosure relates to the Chinese patent application no. 201680060437.1, entitled "Door handle for vehicle" and filed by the applicant on Oct. 20, 2016, and the Chinese patent application no. 201711423248.9, entitled "Hidden type handle assembly" and filed by the applicant on Dec. 25, 2017, which are incorporated herein by reference in their entirety.

Particular embodiments of the present disclosure are described below with reference to the accompanying drawings which constitute part of this description. It is to be understood that although the terms indicating orientations, such as "front", "rear", "upper", "lower", "left", "right", "inner", "outer" "top", "bottom", "obverse" and "reverse", are used in the present disclosure to describe structural parts and elements in various examples of the present disclosure, these terms are used herein only for ease of illustration and are determined based on the exemplary orientations as shown in the accompanying drawings. Since the embodiments disclosed in the present disclosure can be arranged in different orientations, these terms indicating directions are only illustrative and should not be considered as limitations. If possible, the same or similar reference numerals used in the present disclosure refer to the same or similar components.

In the following description, unless otherwise specified, the side facing the outside of the vehicle door is the outer side, and the side facing the inside of the vehicle door is the inner side.

Figure 1B:
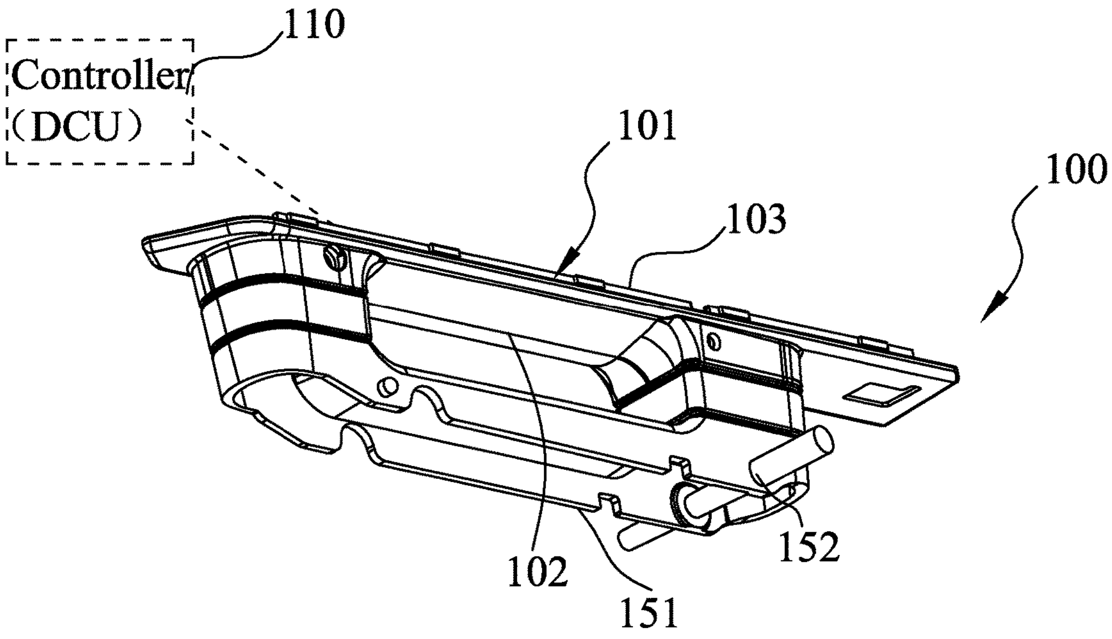
FIG. 1B shows an overall structure of the handle system according to the embodiment of the present disclosure, showing the handle body from another perspective.
Figure 1C:
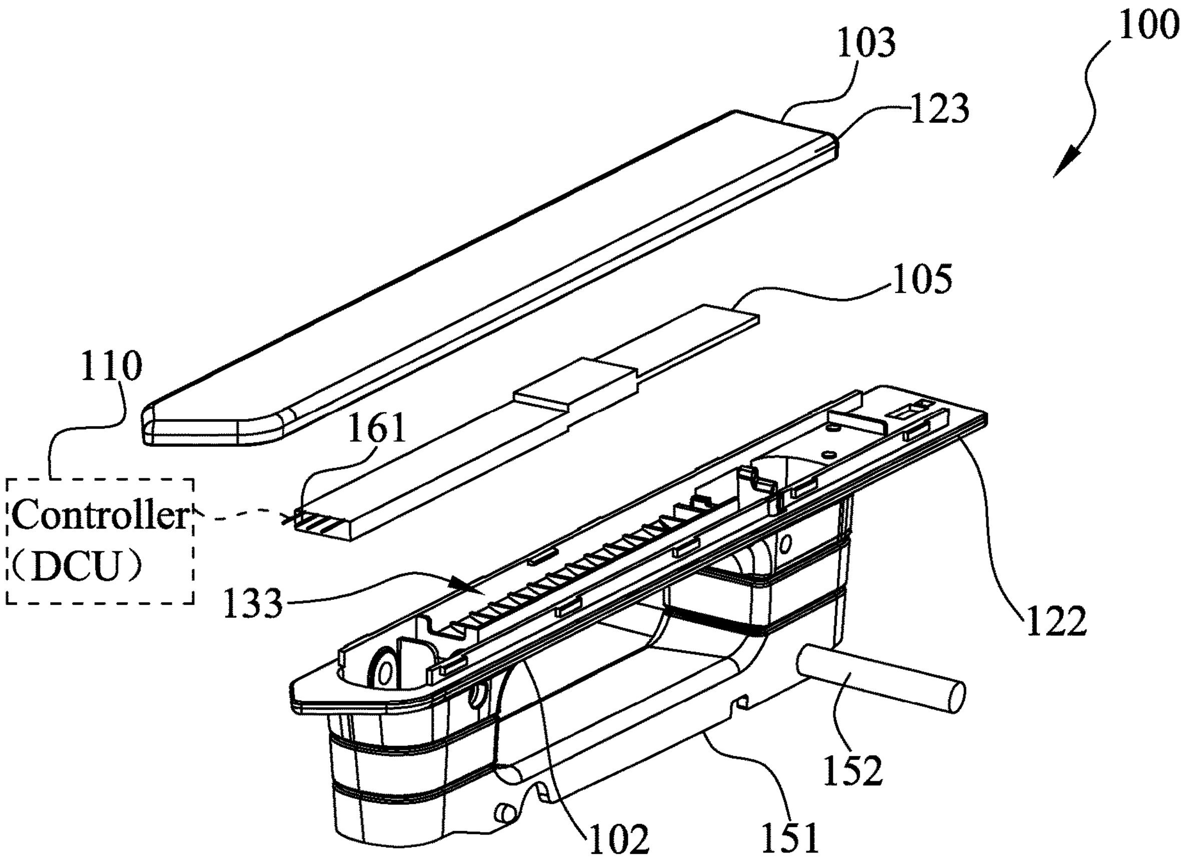
FIG. 1C shows an exploded view of the handle system in FIGS. 1A and 1B.

FIGS. 1A-1C show structural views of a handle system 100 according to one embodiment of the present disclosure, wherein FIGS. 1A and 1B show the overall structures of the handle system 100 from different perspectives of a handle body, and FIG. 1C shows an exploded view of the handle system 100.

As shown in FIGS. 1A-1C, the handle system 100 comprises a handle body 101, a touch sensing device 105 and a controller 110. The handle body 101 is provided with an inner-side grip portion 122 and an outer-side grip portion 123 connected to the inner-side grip portion 122, wherein the inner-side grip portion 122 and the outer-side grip portion 123 respectively have an inner-side surface 102 and an outer-side surface 103 for touch by a user. A mounting structure 151 is provided on the inner-side grip portion 122, and the handle body 101 is mounted on the vehicle door through the mounting structure 151. The handle body 101 can be driven to a retracted position or a deployed position, and can rotate relative to the vehicle door about a shaft 152 provided through the mounting structure 151. A mounting cavity 133 is provided between the inner-side grip portion 122 and the outer-side grip portion 123 for accommodating the touch sensing device 105. The touch sensing device 105 is mounted in the mounting cavity 133 of the handle body 101, for example, by means of gluing or clamping. The touch sensing device 105 is connected to the controller 110 and a power source (not shown), for example via one or more wires 161. The controller 110 is a door control unit (DCU) that can be provided separately, integrated in the handle body 101, or integrated in a central control system of a vehicle.

The touch sensing device 105 comprises one or more sensing circuits. The one or more sensing circuits comprise a touch sensing region that enables the touch sensing device 105 to generate a corresponding sensing signal in response to a touch action on a surface (e.g. an inner-side surface 102 or an outer-side surface 103) of the handle body 101. In the present disclosure, the touch action refers to an action that can be sensed by the touch sensing device 105 such that the touch sensing device 105 generates a sensing signal. According to the characteristics of different touch sensing devices 105, the touch action may be different. For example, for some touch sensing devices 105, it is only necessary to lightly touch the surface of the handle body 101 (e.g. the outer-side surface 103 or the inner-side surface 102) by hand; and for some touch sensing devices 105, it is necessary to apply a certain pressure to the surface (e.g. the outer-side surface 103 or the inner-side surface 102) of the handle body 101 so as to be sensed by the sensing circuits. The touch action comprises touch-slide, that is, touching and sliding. In the present disclosure, the touch sensing device 105 may be a touch type sensing circuit, that is, generating a sensing signal in response to a touch. The touch sensing device 105 may also be a touch-slide type sensing circuit, that is, generating a sensing signal in response to a touch-slide.

In some embodiments, the touch sensing region of the touch sensing device 105 is configured to face the outer-side surface 103 and/or the inner-side surface 102 of the handle body 101, and the area of the touch sensing region is set to be about 90% of the area of the outer-side surface 103 or the inner-side surface 102.

It needs to be noted that, although the touch sensing device 105 is arranged between the inner-side grip portion 122 and the outer-side grip portion 123 of the handle body in the embodiment shown in FIGS. 1A-1C, the touch sensing device 105 may also be configured to be embedded in the inner-side grip portion 122 and/or the outer-side grip portion 123, or configured to be closely adhered to the outer-side surface 103 and/or the inner-side surface 102, as long as a touch action of the user can be sensed.

The controller 110 is capable of generating a control signal according to the sensing signal, and driving the handle body 101 to deploy or retract, and performing activation, locking or other control operations on the vehicle according to the control signal. When the vehicle is in a stopped state, the controller 110 may perform information interaction through a system such as a PEPS, NFC, or Bluetooth configured in the vehicle, so as to receive a sensing signal and activate the vehicle.

The handle body 101 is further provided with a position sensor(s) (not shown in the figures) for detecting the positions of the handle body 101 and sending the detected position information to the controller 110.

Figure 2A:
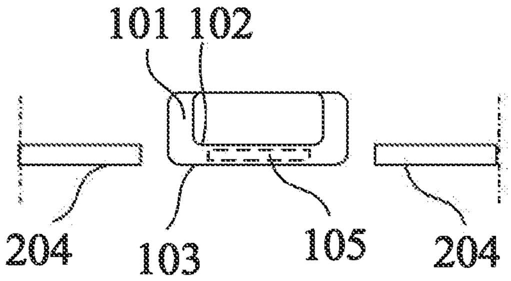
FIGS. 2A-2C show simplified views of the handle body in FIG. 1A at different positions.
Figure 2B:
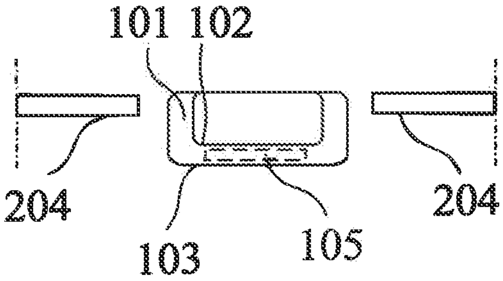
Figure 2C:
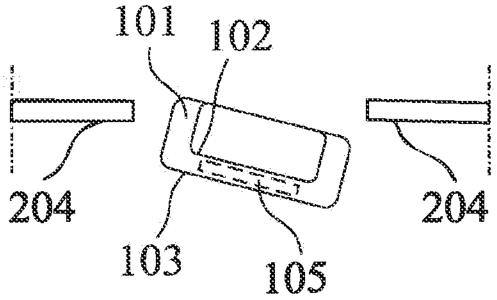

FIGS. 2A-2C show simplified views of the handle body 101 in FIG. 1A at different positions, which respectively show that the handle body 101 is at a retracted position, a deployed position and a release position relative to an outer surface 204 of the vehicle door.

As shown in FIG. 2A, the handle body 101 is at the retracted position. When the handle body is at the retracted position, the outer-side surface 103 of the handle body 101 is flush with the outer surface 204 of the vehicle door, and only the outer-side surface 103 of the handle body 101 is accessible from the outside of the vehicle door. At this time, if the user touches or slidably touches the outer-side surface 103 of the handle body 101, the touch sensing device 105 can be triggered to enable the handle body 101 to deploy.

As shown in FIG. 2B, in the state of the handle body shown in FIG. 2A, after the outer-side surface 103 of the handle body 101 is touched or slidably touched, the handle body 101 can be driven out of the outer surface 204 of the vehicle door to be at the deployed position, such that the inner-side surface 102 of the handle body 101 is exposed. At this time, the user can simultaneously touch the inner-side surface 102 and the outer-side surface 103 of the handle body 101 by hand.

As shown in FIG. 2C, in the state of the handle body shown in FIG. 2B, the user rotates the handle body 101 outwardly by hand so that the handle body 101 is at the release position. At this time, if the user releases the handle body 101, the handle body 101 can automatically return to the deployed position shown in FIG. 2B by means of a reset structure (e.g. a reset spring). Moreover, by touching or slidably touching the inner-side surface 102 and/or the outer-side surface 103 of the handle body 101 again, the touch sensing device 105 can be triggered again so that the handle body 101 can return back to the retracted position of FIG. 2A. When the handle body 101 is at the release position, the vehicle door can be opened by pulling the handle body 101.

Figure 3A:
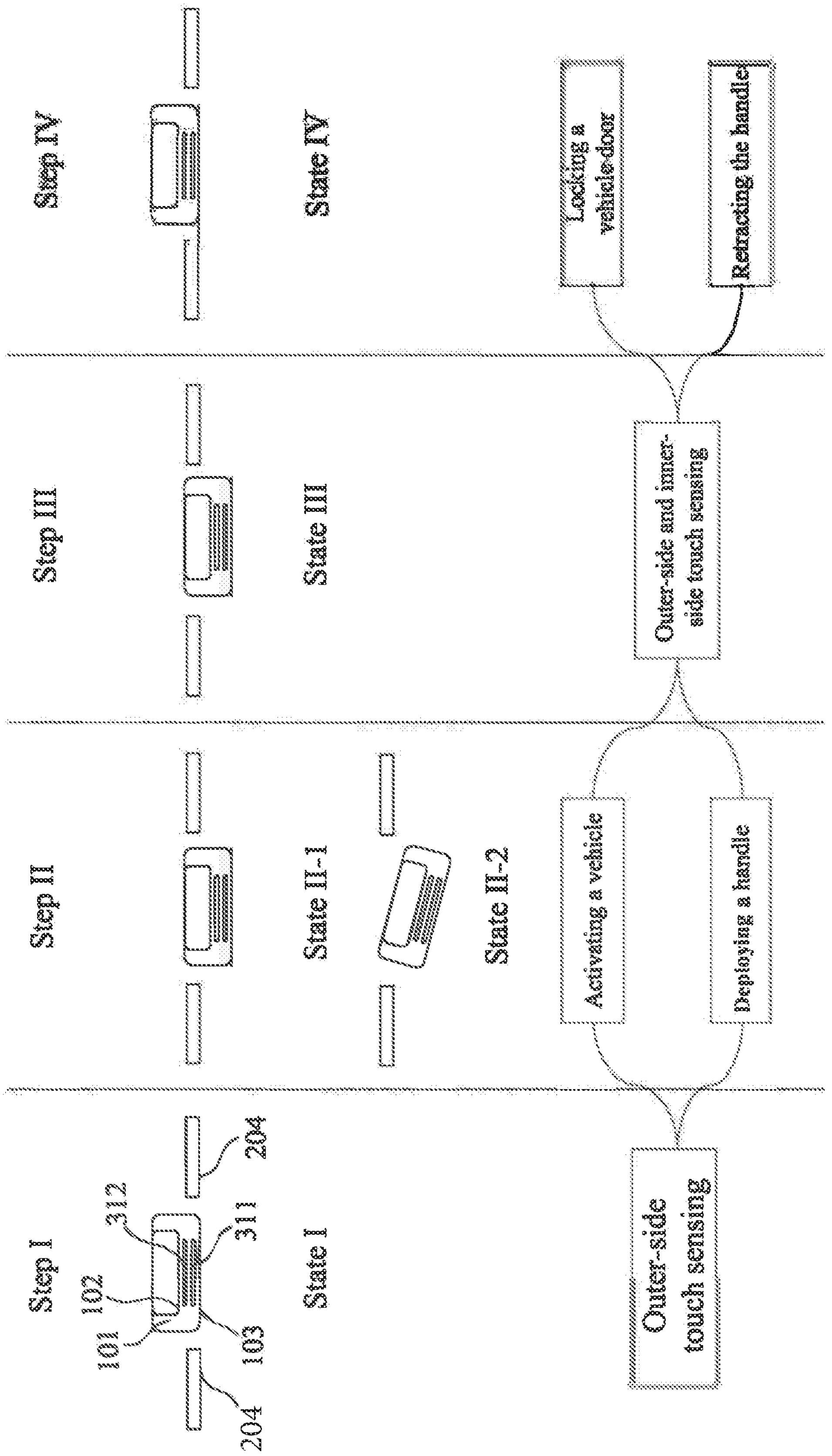
FIG. 3A is an operation flow chart illustrating indicating and controlling the deploying and retracting of the handle body by using two sensing circuits according to the present disclosure.
Figure 3B:
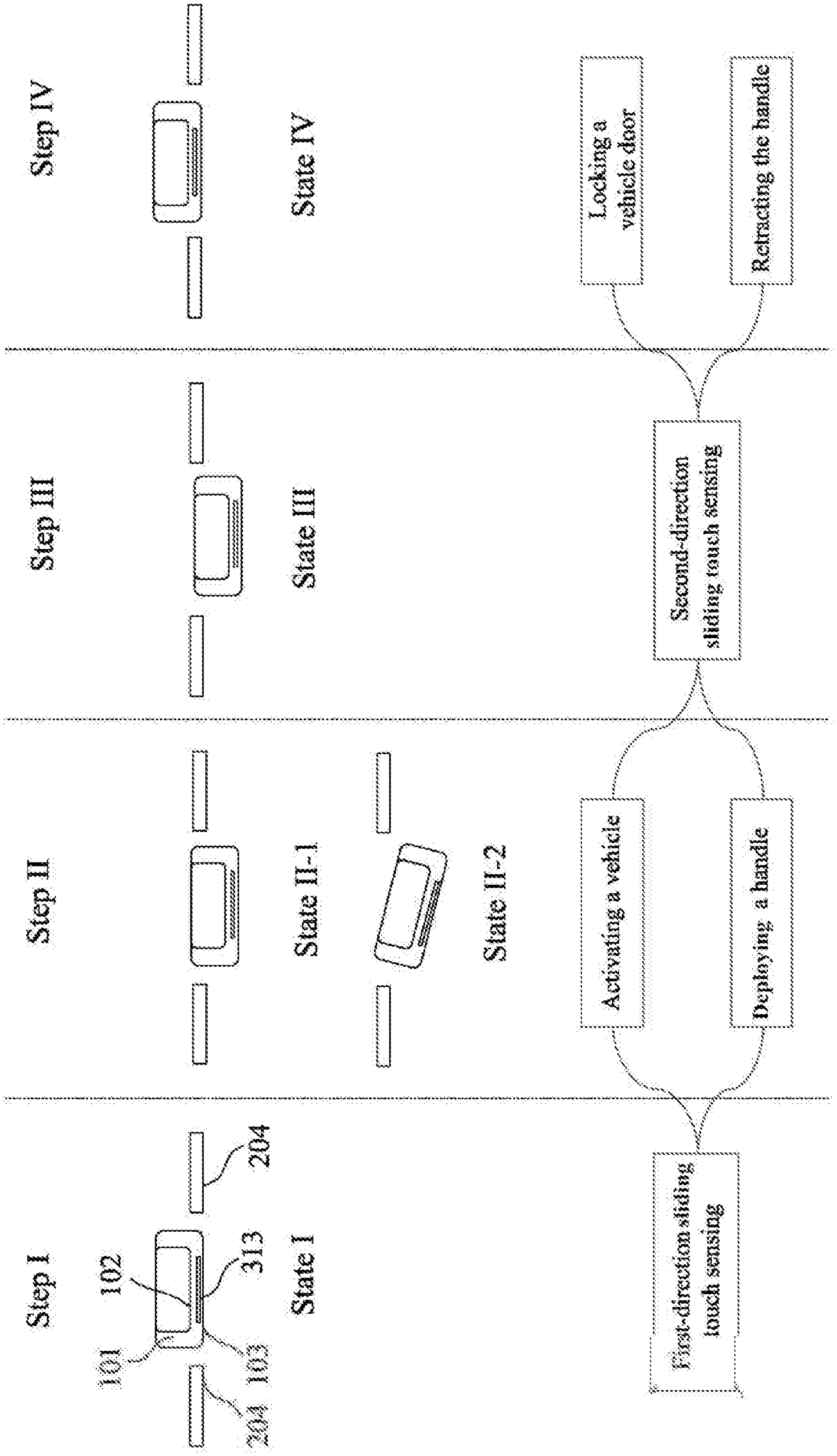
FIG. 3B is an operation flow chart illustrating indicating and controlling the deploying and retracting of the handle body by using one sensing circuit according to the present disclosure.

FIGS. 3A and 3B show two embodiments of the operation flow for controlling the deploying and retracting of the handle body according to the present disclosure. FIG. 3A is an operation flow chart illustrating indicating and controlling the deploying and retracting of the handle body by using two sensing circuits; and FIG. 3B is an operation flow chart illustrating indicating and controlling the deploying and retracting of the handle body by using one sensing circuit.

In the embodiment as shown in FIG. 3A, two sensing circuits, that is, an outer-side sensing circuit 311 and an inner-side sensing circuit 312, are employed or used. The outer-side sensing circuit 311 and the inner-side sensing circuit 312 are respectively arranged proximate to the outer-side surface 103 and the inner-side surface 102 of the handle body 101. The outer-side sensing circuit 311 and the inner-side sensing circuit 312 are capable of respectively generating an outer-side sensing signal and an inner-side sensing signal in response to a touch on the outer-side surface 103 and a touch on the inner-side surface 102 of the handle body 101. The operations of indicating and controlling the deploying and retracting of the handle body 101 by the two sensing circuits 311 and 312 comprise four steps as follows:

Step I: when the handle body 101 is at the retracted position (state I) and the vehicle door is in a closed state, if the vehicle door needs to be opened, the user touches the outer-side surface 103 of the handle body 101 by hand to trigger the outer-side sensing circuit 311, and then the operation turns to step II.

Step II: in response to the touch on the outer-side surface 103 in step I, the outer-side sensing circuit 311 generates an outer-side sensing signal, such that the controller 110 activates the vehicle according to the outer-side sensing signal and controls the handle body 101 to be driven to the deployed position (state II-1). Activating a vehicle refers to changing the state of the vehicle from an unmanipulable state to a manipulable state, for example, when the vehicle is in a non-activated state, the vehicle door is locked and cannot be opened, and the vehicle door can be opened when the vehicle is in an activated state. When the handle body 101 is at the deployed position, the user can rotate or pull the handle body 101 by holding the same by hand, such that the handle body 101 reaches the release position (state II-2) to allow to open the vehicle door. During the process of the user rotating or pulling the handle body 101 to the release position by holding the same by hand, the outer-side surface 103 and the inner-side surface 102 of the handle body 101 are simultaneously touched, such that the outer-side sensing circuit 311 and the inner-side sensing circuit 312 respectively generate an outer-side sensing signal and an inner-side sensing signal.

Step III: the user releases the handle body 101, causing the handle body 101 to be automatically returned to the deployed position by the reset device (e.g. the reset spring) (state III). After the user releases the handle body 101, neither the outer-side surface 103 nor the inner-side surface 102 of the handle body 101 is touched any more, such that both of the outer-side sensing signal and the inner-side sensing signal cease.

In step IV, the controller 110 controls the retracting of the handle body 101 and locks the vehicle door according to an indication that both of the outer-side sensing signal and the inner-side sensing signal cease, and the handle body 101 returns to the retracted position (state IV). In some embodiments, the controller 110 can also control the retracting of the handle body and lock the vehicle door after both of the outer-side sensing signal and the inner-side sensing signal cease for a period of time (e.g. 3 to 5 seconds).

In some embodiments, if the outer-side sensing circuit 311 is triggered again when the handle body 101 is at the deployed position, the action of deploying the handle may still be performed, but since the handle body 101 has been deployed, the handle body 101 remains in the deployed position.

In the embodiment as shown in FIG. 3B, one sensing circuit, that is, a touch-slide type sensing circuit 313, is employed or used. The touch-slide type sensing circuit 313 is arranged proximate to the outer-side surface 103 of the handle body 101. The touch-slide type sensing circuit 313 is capable of generating a first-direction touch-slide sensing signal in responsive to a sliding touch action on the outer-side surface 103 of the handle body 101 in a first direction and a second-direction touch-slide sensing signal in responsive to a sliding touch action on the outer-side surface 103 of the handle body 101 in a different second direction. The operations of indicating and controlling the deploying and retracting of the handle body 101 by one touch-slide type sensing circuit 313 comprise four steps as follows:

Step I: when the handle body 101 is at the retracted position (state I) and the vehicle door is in a closed state, if the vehicle door needs to be opened, the outer-side surface 103 of the handle body 101 is slidably touched in the first direction by hand.

Step II: in response to the sliding touch on the outer-side surface 103 in the first direction in step I, the touch-slide type sensing circuit 313 generates a first-direction touch-slide sensing signal, such that the controller 110 activates the vehicle according to the first-direction touch-slide sensing signal and controls the handle body 101 to be driven to the deployed position (state II-1). When the handle body 101 is at the deployed position, the user can rotate or pull the handle body 101 by holding the same by hand, such that the handle body 101 reaches the release position (state II-2) to allow to open the vehicle door.

Step III: the handle body 101 is released, causing the handle body 101 to be automatically returned to the deployed position by the reset device (e.g. the reset spring) (state III). After that, if the outer-side surface 103 of the handle body 101 is slidably touched in the second direction, the touch-slide type sensing circuit 313 can generate a second-direction touch-slide sensing signal.

Step IV: the controller 110, according to the second-direction touch-slide sensing signal, locks the vehicle door and controls the handle body 101 to be driven back to the retracted position (state IV). In some embodiments, the controller 110 can also control the retracting of the handle body 101 and lock the vehicle door after receiving the second-direction touch-slide sensing signal for a period of time (e.g. 3 to 5 seconds).

In this embodiment, the first direction is different from the second direction, for example, the first direction may be from left to right, while the second direction may be from right to left; or the first direction may be clockwise, while the second direction may be counter-clockwise. Moreover, the sliding touch in the first direction and the sliding touch in the second direction may comprise various motion trajectories, such as linear motion, curvilinear motion and other more complex motion trajectories.

Figure 4A:
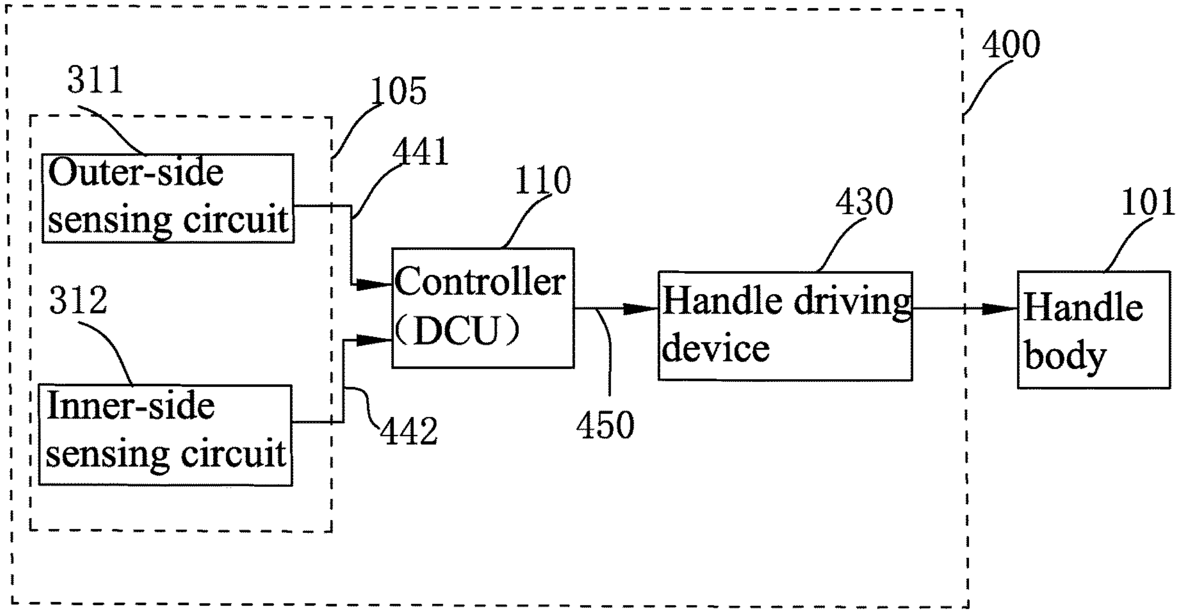
FIG. 4A is a block diagram illustrating one embodiment of a control system that implements the operation flow of controlling deploying and retracting of the handle body as shown in FIG. 3A.
Figure 4B:
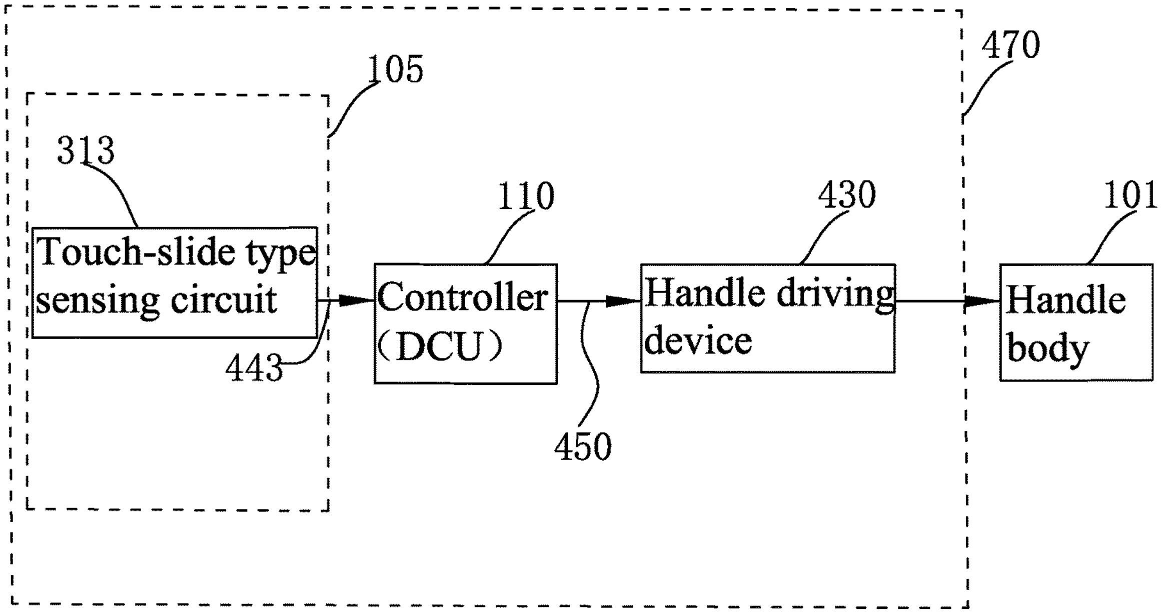
FIG. 4B is a block diagram illustrating one embodiment of a control system that implements the operation flow of controlling deploying and retracting of the handle body as shown in FIG. 3B.

FIG. 4A is a block diagram illustrating one embodiment of a control system 400 that implements the operation flow of controlling deploying and retracting of the handle body as shown in FIG. 3A. FIG. 4B is a block diagram illustrating one embodiment of a control system 470 that implements the operation flow of controlling deploying and retracting of the handle body as shown in FIG. 3B.

As shown in FIG. 4A, the control system 400 comprises the touch sensing device 105, the controller 110 and a handle driving device 430, wherein the touch sensing device 105, the controller 110 and the handle driving device 430 are communicatively connected in sequence. The touch sensing device 105 comprises the outer-side sensing circuit 311 and the inner-side sensing circuit 312 that are respectively arranged proximate to the outer-side surface 103 and the inner-side surface 102 of the handle body 101. When the outer-side surface 103 of the handle body 101 is touched, the outer-side sensing circuit 311 generates an outer-side sensing signal, and when the inner-side surface 102 of the handle body 101 is touched, the inner-side sensing circuit 312 generates an inner-side sensing signal. The outer-side sensing circuit 311 and the inner-side sensing circuit 312 are communicatively connected to the controller 110 via connections 441 and 442, respectively, so as to send the generated sensing signals to the controller 110. The controller 110 is communicatively connected to the handle driving device 430 via a connection 450 to send a first control signal and a second control signal to the handle driving device 430. The handle driving device 430 is connected to the handle body 101, and drives the handle body 101 to deploy according to the first control signal or drives the handle body 101 to retract according to the second control signal. The handle driving device 430 may comprise a motor, an electric motor or the like for providing driving force, and can be controlled by the controller 110 to mechanically or electromagnetically drive the handle body 101 to perform a corresponding action.

The working process of the control system 400 shown in FIG. 4A is as follows:

When the outer-side surface 103 of the handle body 101 is touched, the outer-side sensing circuit 311 generates an outer-side sensing signal, and when the inner-side surface 102 of the handle body 101 is touched, the inner-side sensing circuit 312 generates an inner-side sensing signal. After receiving the outer-side sensing signal and/or the inner-side sensing signal, the controller 110 generates a corresponding control signal according to a preset control logic or program. For example, when only the outer-side sensing signal is received, the controller 110 generates a first control signal indicating the deploying of the handle, and performs an operation of activating the vehicle according to the preset control logic or program; and when the received outer-side sensing signal and inner-side sensing signal both cease, the controller 110 generates a second control signal indicating the retracting of the handle, and performs an operation of locking the vehicle door according to the preset control logic or program. In some embodiments, the controller 110 can also generate the second control signal indicating the retracting of the handle, and perform an operation of locking the vehicle door according to the preset control logic or program after both of the outer-side sensing signal and the inner-side sensing signal cease for a period of time (e.g. 3 to 5 seconds).

As shown in FIG. 4B, the control system 470 comprises the touch sensing device 105, the controller 110 and the handle driving device 430, wherein the touch sensing device 105, the controller 110 and the handle driving device 430 are communicatively connected in sequence. The touch sensing device 105 comprises the touch-slide type sensing circuit 313, the touch-slide type sensing circuit 313 being arranged proximate to the outer-side surface 103 of the handle body 101, wherein the touch-slide type sensing circuit 313 is communicatively connected to the controller 110 via a connection 443 to send the generated sensing signals to the controller 110. The controller 110 is communicatively connected to the handle driving device 430 via the connection 450 to send the first-direction control signal and the second-direction control signal to the handle driving device 430. The handle driving device 430 is connected to the handle body 101, and drives the handle body 101 to deploy according to the first-direction control signal or drives the handle body 101 to retract according to the second-direction control signal.

The working process of the control system 470 shown in FIG. 4B is as follows:

When the outer-side surface 103 of the handle body 101 is slidably touched in the first direction, the touch-slide type sensing circuit 313 generates a first-direction touch-slide sensing signal according to the change of the touch positions, and sends the signal to the controller 110; and when the outer-side surface 103 of the handle body 101 is slidably touched in the second direction, the touch-slide type sensing circuit 313 generates a second-direction touch-slide sensing signal according to the change of the touch positions, and sends the signal to the controller 110.

After receiving the first-direction touch-slide sensing signal or the second-direction touch-slide sensing signal from the touch-slide type sensing circuit 313, the controller 110 generates a corresponding control signal according to a preset control logic or program. For example, when the first-direction touch-slide sensing signal is received, the controller 110 generates the first-direction control signal indicating the deploying of the handle, and performs an operation of activating the vehicle according to the preset control logic or program; and when the second-direction touch-slide sensing signal is received, the controller 110 generates the second-direction control signal indicating the retracting of the handle, and performs an operation of locking the vehicle door according to the preset control logic or program. In some embodiments, the controller 110 can also generate the second-direction control signal indicating the retracting of the handle, and perform the operation of locking the vehicle door according to the preset control logic or program after receiving the second-direction touch-slide sensing signal for a period of time (e.g. 3 to 5 seconds).

Figure 5A:
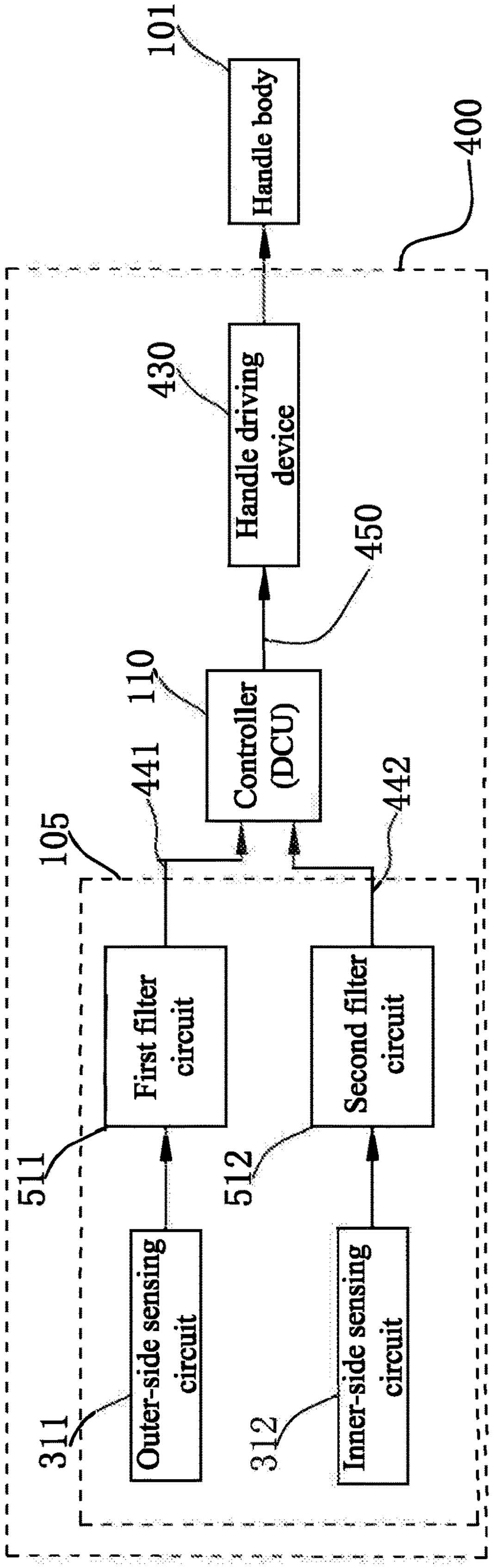
FIG. 5A is a block diagram illustrating another embodiment of the control circuit of FIG. 3A for controlling the deploying and retracting actions of the handle body.
Figure 5B:
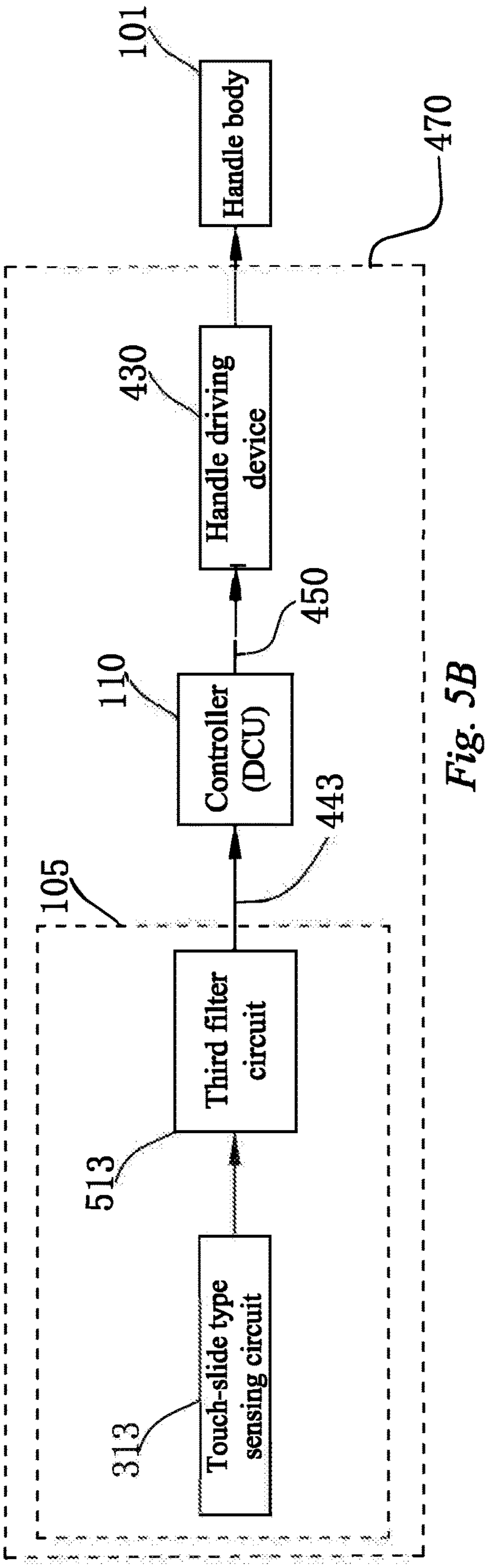
FIG. 5B is a block diagram illustrating another embodiment of the control circuit of FIG. 3B for controlling the deploying and retracting actions of the handle body.

FIG. 5A is a block diagram illustrating another embodiment of the control system 400 that implements the operation flow of controlling deploying and retracting of the handle body shown in FIG. 3A. FIG. 5B is a block diagram illustrating another embodiment of the control system 470 that implements the operation flow of controlling deploying and retracting of the handle body shown in FIG. 3B. The embodiments shown in FIGS. 5A and 5B are respectively similar to the embodiments shown in FIGS. 4A and 4B, except that filter circuits are further provided in the embodiments shown in FIGS. 5A and 5B.

As shown in FIG. 5A, the touch sensing device 105 further comprises a first filter circuit 511 and a second filter circuit 512, wherein the first filter circuit 511 is communicatively connected between the outer-side sensing circuit 311 and the controller 110, and the second filter circuit 512 is communicatively connected between the inner-side sensing circuit 312 and the controller 110. The first filter circuit 511 and the second filter circuit 512 can respectively receive the outer-side sensing signal generated by the outer-side sensing circuit 311 and the inner-side sensing signal generated by the inner-side sensing circuit 312, and can perform filter processing on the received signals and then send the filter-processed sensing signals to the controller 110 via the connections 441 and 442. The first filter circuit 511 and the second filter circuit 512 can filter out, from the outer-side sensing signal and the inner-side sensing signal, interference clutters and noises generated by other devices, thereby making the touch sensing more precise. In some embodiments, the first filter circuit 511 and the second filter circuit 512 can be filter capacitors.

As shown in FIG. 5B, the touch sensing device 105 further comprises a third filter circuit 513, wherein the third filter circuit 513 is communicatively connected between the touch-slide type sensing circuit 313 and the controller 110. The third filter circuit 513 can receive the touch-slide sensing signals generated by the touch-slide type sensing circuit 313, and can perform filter processing on the received signals and then send the filter-processed sensing signals to the controller 110 via the connection 443. The third filter circuit 513 can filter out, from the sensing signals, interference clutters and noises generated by other devices, thereby making the touch sensing more precise. In some embodiments, the filter circuits can be filter capacitors.

Figure 6A:
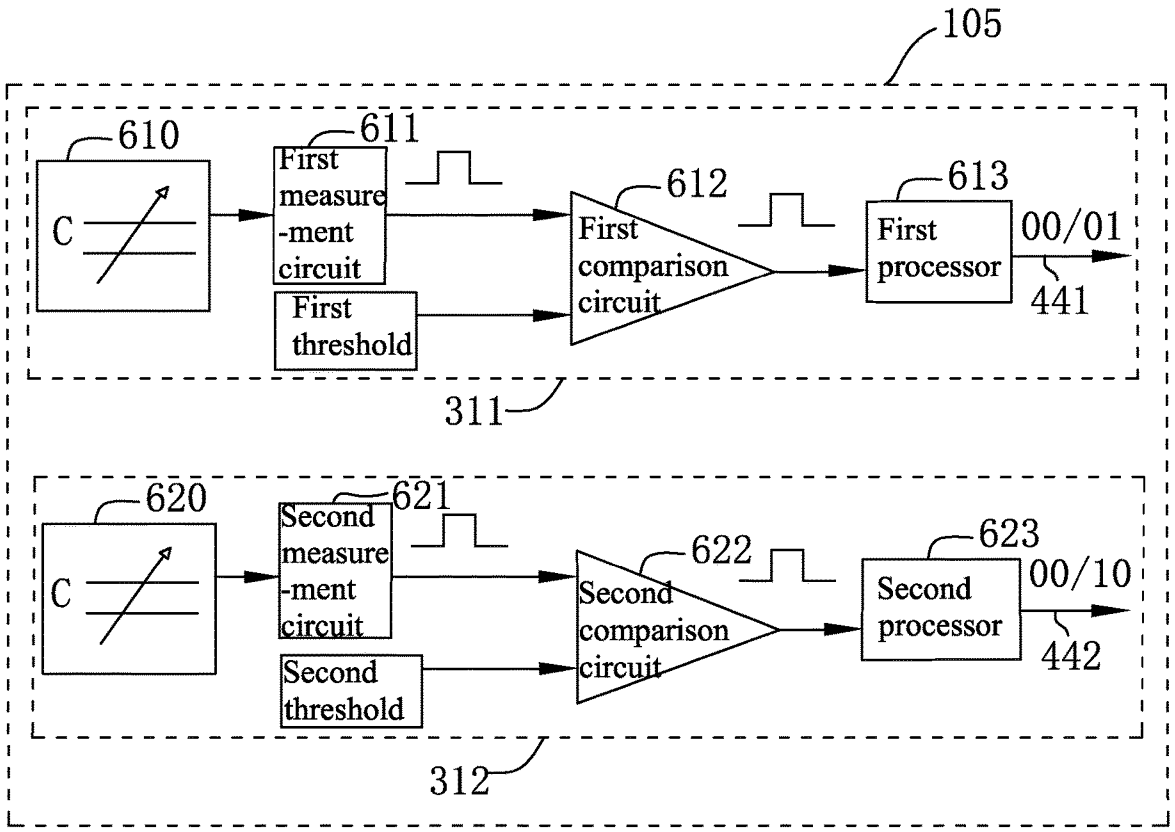
FIG. 6A is a block diagram illustrating functional modules according to one embodiment of the touch sensing device in the embodiment of FIG. 4A/5A.
Figure 6B:
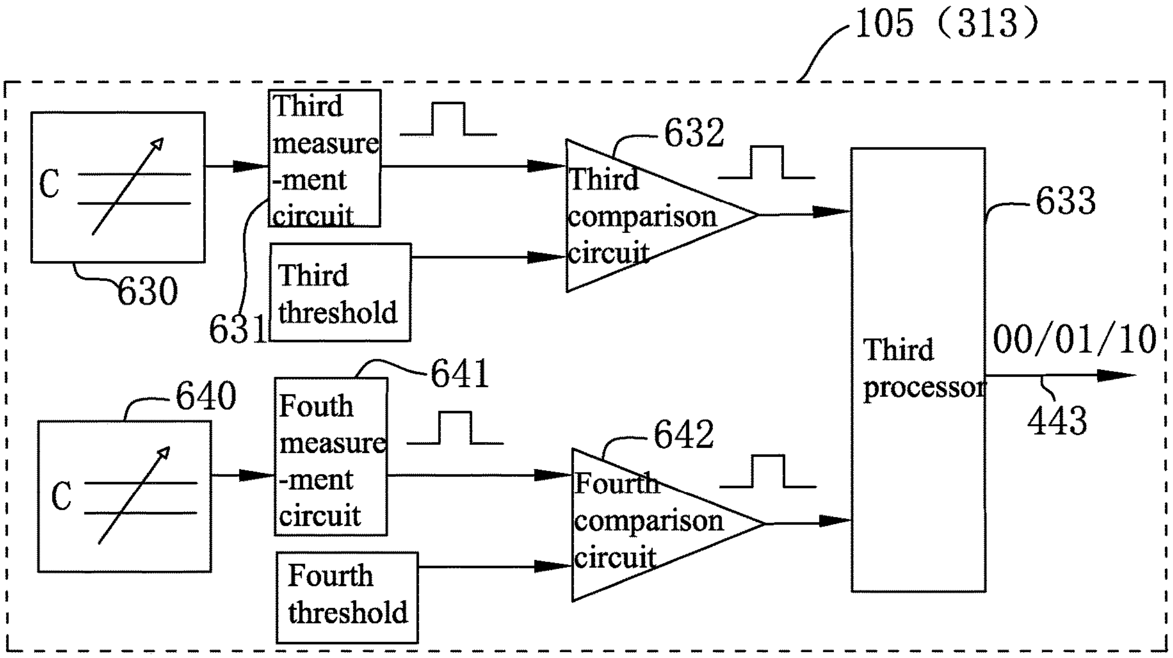
FIG. 6B is a block diagram illustrating functional modules according to one embodiment of the touch sensing device in the embodiment of FIG. 4B/5B.

FIG. 6A is a block diagram illustrating functional modules according to one embodiment of the touch sensing device 105 of FIG. 4A/5A. FIG. 6B is a block diagram illustrating functional modules according to one embodiment of the touch sensing device 105 of FIG. 4B/5B.

As shown in FIG. 6A, the touch sensing device 105 comprises the outer-side sensing circuit 311 and the inner-side sensing circuit 312. The outer-side sensing circuit 311 comprises a first capacitive sensor 610, a first measurement circuit 611, a first comparison circuit 612 and a first processor 613 connected in sequence. The inner-side sensing circuit 312 comprises a second capacitive sensor 620, a second measurement circuit 621, a second comparison circuit 622 and a second processor 623 connected in sequence.

In some embodiments, the first capacitive sensor 610/the second capacitive sensor 620 comprises two parallel electrode plates separated by an insulating medium, and there is a certain distance between the two electrode plates. In response to a touch action of a hand, the distance between the two electrode plates of the first capacitive sensor 610/the second capacitive sensor 620 changes, such that the capacitance of the first capacitive sensor 610/the second capacitive sensor 620 changes.

In some other embodiments, the first capacitive sensor 610/the second capacitive sensor 620 comprises a touch electrode. Since human body tissues are filled with conductive electrolyte, a human body (e.g. a finger) will form a coupling capacitor with the first capacitive sensor 610/the second capacitive sensor 620 when contacting or approaching the touch electrode, such that the capacitance of the first capacitive sensor 610/the second capacitive sensor 620 is increased.

In some embodiments, the first measurement circuit 611/the second measurement circuit 621 is configured for converting the capacitance of the first capacitive sensor 610/the second capacitive sensor 620 and its change value into a corresponding voltage, current or frequency signal, thereby facilitating detection, calculation, etc. In some embodiments, the first measurement circuit 611/the second measurement circuit 621 may comprise an operational amplifier type circuit, and the first capacitive sensor 610/the second capacitive sensor 620 is connected to the operational amplifier type circuit. An output voltage of the operational amplifier type circuit is proportional to the capacitance of the first capacitive sensor 610/the second capacitive sensor 620. Therefore, the first measurement circuit 611/the second measurement circuit 621 converts, by a change in a voltage value at an output end of the operational amplifier type circuit, a change in capacitance of the first capacitive sensor 610/the second capacitive sensor 620 into a measured voltage signal for output. In the embodiment where the first capacitive sensor 610/the second capacitive sensor 620 comprises two parallel electrode plates, the relationship between the output voltage of the operational amplifier type circuit and the distance between the electrode plates of the first capacitive sensor 610/the second capacitive sensor 620 is linear.

In some embodiments, the first comparison circuit 612/the second comparison circuit 622 can be a voltage comparator. One input end of the first comparison circuit 612/the second comparison circuit 622 receives the measured voltage signal output by the first measurement circuit 611/the second measurement circuit 621, and the other input end thereof receives a preset threshold voltage; and an output end of the first comparison circuit 612/the second comparison circuit 622 is connected to the first processor 613/the second processor 623. The first comparison circuit 612/the second comparison circuit 622 compares the measured voltage signal obtained from the first measurement circuit 611/the second measurement circuit 621 with a preset first threshold voltage signal/second threshold voltage signal, and if the measured voltage signal exceeds the first threshold voltage signal/the second threshold voltage signal, a high level signal is output to the first processor 613/the second processor 623 (or if the measured voltage signal exceeds the first threshold voltage signal/the second threshold voltage signal, a low level signal is output). If the measured voltage signal does not exceed the first threshold voltage signal/the second threshold voltage signal, a low level signal is output to the first processor 613/the second processor 623 (or if the measured voltage signal does not exceed the first threshold voltage signal/the second threshold voltage signal, a high level signal is output). By means of the threshold voltage signal preset in the first comparison circuit 612/the second comparison circuit 622, it is possible to filter out a capacitance value change that is caused due to other items accidentally triggering the sensing circuit and is smaller than a capacitance value change caused by finger touching, thereby making the touch sensing more precise. For example, when other items accidentally triggering the sensing circuit results in a small capacitance value of the first capacitive sensor 610/the second capacitive sensor 620, the measured voltage signal does not exceed the threshold voltage signal, and thus a low level signal is output to the first processor 613/the second processor 623, i.e. no valid signal output is caused.

In some embodiments, the first processor 613/the second processor 623 comprises internally integrated control logic and analog-to-digital converter. The first processor 613/the second processor 623 receives a high level signal output by the first comparison circuit 612/the second comparison circuit 622, so that the internally integrated control logic and analog-to-digital converter thereof convert the high level signal into a digital signal for output to the controller 110. After the first processor 613/the second processor 623 outputs the digital signal to the controller 110, the control logic thereof resets and clears the signal received by the analog-to-digital converter.

For the embodiment of FIG. 4A/5A, the relationship between the signals output by the first processor 613 and the second processor 623 and whether a touch is sensed by the outer-side sensing circuit 311/the inner-side sensing circuit 312 or not is shown in Table 1 below:

TABLE 1

| Is a touch sensed by the first capacitive sensor 610? | Is a touch sensed by the second capacitive sensor 620? | Signal output by the first processor 613 | Signal output by the second processor 623 |
|---|---|---|---|
| No | No | 00 | 00 |
| Yes | No | 01 | 00 |
| Yes | Yes | 01 | 10 |

The signal 00 output by the first processor 613 and the second processor 623 represents an invalid sensing signal, the signal 01 output by the first processor 613 represents the outer-side sensing signal, and the signal 10 output by the second processor 623 represents the inner-side sensing signal.

As shown in FIG. 6B, the touch sensing device 105 comprises the touch-slide type sensing circuit 313, the touch-slide type sensing circuit 313 comprising a third capacitive sensor 630, a third measurement circuit 631 and a third comparison circuit 632 connected in sequence, a fourth capacitive sensor 640, a fourth measurement circuit 641 and a fourth comparison circuit 642 connected in sequence, and a third processor 633 connected to the third comparison circuit 632 and the fourth comparison circuit 642.

In some embodiments, the third capacitive sensor 630/the fourth capacitive sensor 640 comprises two electrode plates separated by an insulating medium, and there is a certain distance between the two electrode plates. In response to a touch action of a hand, the distance between the two electrode plates of the third capacitive sensor 630/the fourth capacitive sensor 640 changes, such that the capacitance of the third capacitive sensor 630/the fourth capacitive sensor 640 changes.

In some other embodiments, the third capacitive sensor 630/the fourth capacitive sensor 640 comprises a touch electrode. Since human body tissues are filled with conductive electrolyte, a human body (e.g. a finger) will form a coupling capacitor with the third capacitive sensor 630/the fourth capacitive sensor 640 when contacting or approaching the touch electrode, such that the capacitance value of the third capacitive sensor 630/the fourth capacitive sensor 640 is increased.

In some embodiments, the third measurement circuit 631/the fourth measurement circuit 641 is configured for converting the capacitance of the third capacitive sensor 630/the fourth capacitive sensor 640 and its change value into a corresponding voltage, current or frequency signal, thereby facilitating detection, calculation, etc. In some embodiments, the third measurement circuit 631/the fourth measurement circuit 641 may comprise an operational amplifier type circuit, and the third capacitive sensor 630/the fourth capacitive sensor 640 is connected to the operational amplifier type circuit. An output voltage of the operational amplifier type circuit is proportional to the capacitance of the third capacitive sensor 630/the fourth capacitive sensor 640. Therefore, the third measurement circuit 631/the fourth measurement circuit 641 converts, by the change in a voltage value at the output end of the operational amplifier type circuit, a change in the capacitance value of the third capacitive sensor 630/the fourth capacitive sensor 640 into a measured voltage signal for output. In the embodiment where the third capacitive sensor 630/the fourth capacitive sensor 640 comprises two parallel electrode plates, the relationship between the output voltage of the operational amplifier type circuit and the distance between the electrode plates of the third capacitive sensor 630/the fourth capacitive sensor 640 is linear.

In some embodiments, the third comparison circuit 632/the fourth comparison circuit 642 may be a voltage comparator. One input end of the voltage comparator receives the measured voltage signal output by the third measurement circuit 631/the fourth measurement circuit 641, and the other input end thereof receives a preset third threshold voltage signal/fourth threshold voltage signal; and an output end of the voltage comparator is connected to the third processor 633. The third comparison circuit 632/the fourth comparison circuit 642 respectively compares the measured voltage signal obtained from the third measurement circuit 631/the fourth measurement circuit 641 with the preset third threshold voltage signal/fourth threshold voltage signal, and if the measured voltage signal exceeds the third threshold voltage signal/the fourth threshold voltage signal, a high level signal is output to the third processor 633 (or if the measured voltage signal exceeds the third threshold voltage signal/the fourth threshold voltage signal, a low level signal is output), and if the measured voltage signal does not exceed the threshold voltage signal, a low level signal is output to the third processor 633 (or if the measured voltage signal does not exceed the threshold voltage signal, a high level signal is output). By means of the preset threshold voltage signal, the third comparison circuit 632/the fourth comparison circuit 642 can filter out the capacitance value change caused by other items accidentally triggering the sensing circuit, thereby making the touch sensing more precise. For example, when other items accidentally triggering the sensing circuit results in a small change of a capacitance value of the third capacitive sensor 630/the fourth capacitive sensor 640, the measured voltage signal does not exceed the threshold voltage signal, and thus a low level signal is output to the third processor 633, i.e. no valid signal output is caused.

The third processor 633 comprises the internally integrated control logic and analog-to-digital converter. The third processor 633 receives high level signals output by the third comparison circuit 632 and the fourth comparison circuit 642, and, by means of the integrally integrated control logic and analog-to-digital converter in the third processor 633, output different digital signals to the controller 110 according to different orders of receiving the high level signals output by the third comparison circuit 632 and the fourth comparison circuit 642.

For the embodiment of FIG. 4B/5B, the relationship between the signals output by the third processor 633 and whether a touch is sensed by the third capacitive sensor 630/the fourth capacitive sensor 640 of the touch-slide type sensing circuit 313 or not is shown in Table 2 below:

TABLE 2

| Is a touch sensed by the third capacitive sensor 630? | Is a touch sensed by the fourth capacitive sensor 640? | Is the third comparison circuit 632 or the fourth comparison circuit 642 that first outputs a high level? | Signal output by the third processor 633 |
|---|---|---|---|
| No | No | / | 00 |
| Yes | Yes | The third comparison circuit 632 | 01 |
| Yes | Yes | The fourth comparison circuit 642 | 10 |

The signal 00 output by the third processor 633 represents an invalid sensing signal, the signal 01 represents the first-direction touch-slide sensing signal, and the signal 10 represents a second-direction touch-slide sensing signal.

Figure 7:
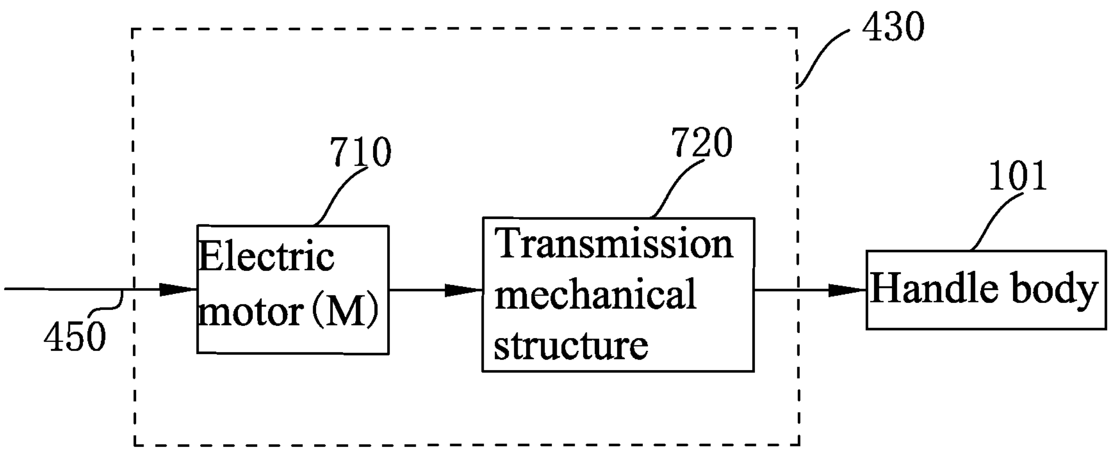
FIG. 7 is a block diagram illustrating one embodiment of the handle driving device in the embodiments of FIGS. 4A/5A and 4B/5B.

FIG. 7 is a block diagram illustrating one embodiment of the handle driving device 430 in the embodiment of FIGS. 4A/5A and 4B/5B. As shown in FIG. 7, the handle driving device 430 comprises an electric motor 710 and a transmission mechanical structure 720, wherein the electric motor 710 drives the transmission mechanical structure 720. The electric motor 710 is connected to the controller 110 via the connection 450, and the transmission mechanical structure 720 is connected to the handle body 101 to drive the handle body 101. The transmission mechanical structure 720 can comprise components such as gears and racks. When the controller 110 outputs the first control signal/the first-direction control signal used for deploying the handle body 101, the electric motor 710 rotates forward (or reversely) according to the control signal, and the forward rotation (or reverse rotation) of the electric motor 710 is converted into a linear motion in one direction by the transmission mechanical structure 720, which drives the deploying of the handle body 101. When the controller 110 outputs the second control signal/the second-direction control signal used for retracting the handle body 101, the electric motor 710 rotates reversely (or forward) according to the control signal, and the reverse rotation (or forward rotation) of the electric motor 710 is converted into a linear motion in a direction opposite to the one direction by the transmission mechanical structure 720, which drives the retracting of the handle body 101.

Figure 8A:
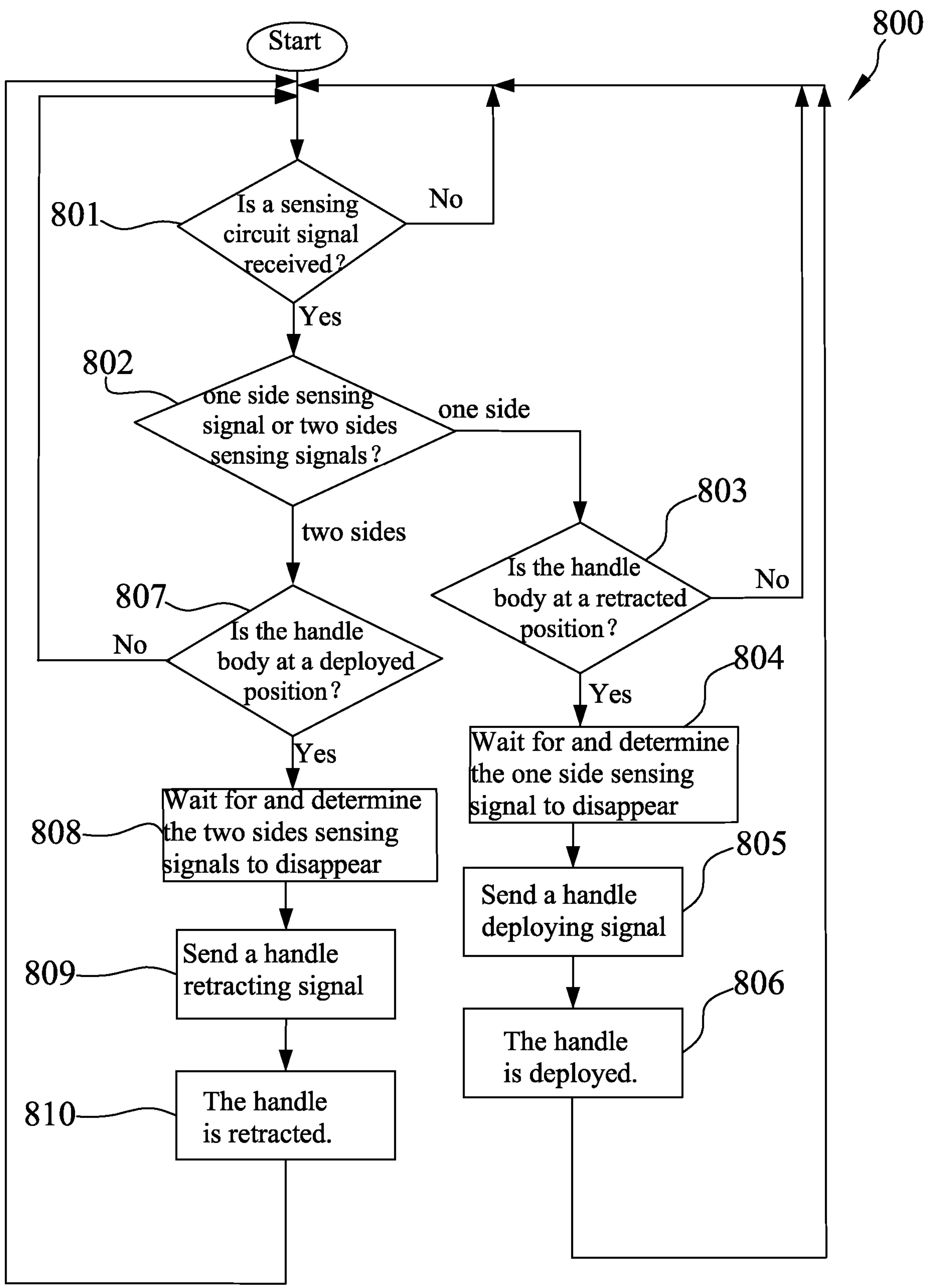
FIG. 8A is a flowchart illustrating one embodiment of a control flow of the controller in the embodiment of FIG. 4A/5A.
Figure 8B:
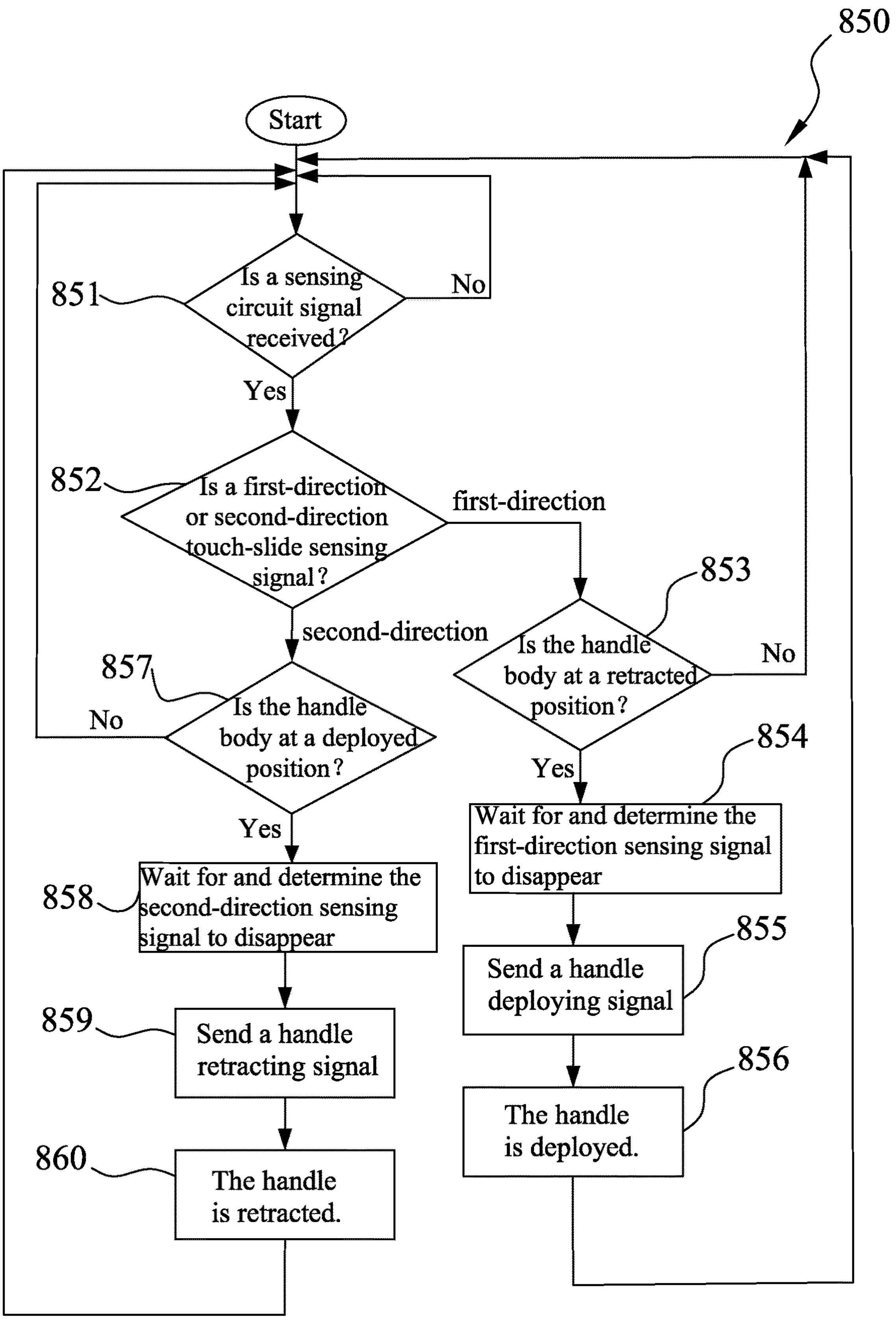
FIG. 8B is a flowchart illustrating one embodiment of a control flow of the controller in the embodiment of FIG. 4B/5B.

FIG. 8A is a flowchart illustrating one embodiment of a control flow 800 of the controller 110 in the embodiment shown in FIG. 4A/5A. FIG. 8B is a flowchart illustrating one embodiment of a control flow 850 of the controller 110 in the embodiment shown in FIG. 4B/5B.

As shown in FIG. 8A, for the embodiment shown in FIG. 4A/5A of indicating and controlling the deploying and retracting of the handle body by using two sensing circuits, one embodiment of the control flow 800 of the controller 110 is specifically described in the following.

In step 801, the controller 110 determines whether a sensing signal generated by the outer-side sensing circuit 311 and/or a sensing signal generated by the inner-side sensing circuit 312 is received, and if yes, the controller 110 turns the operation to step 802, otherwise step 801 continues to be executed.

In step 802, the controller 110 determines whether one side sensing signal is received or two side sensing signals are received. If one side sensing signal is received, the controller 110 turns the operation to step 803, and if two side sensing signals are received, the controller 110 turns the operation to step 807.

In step 803, the controller 110 determines whether the handle is at the retracted position, and if the handle is at the retracted position, the controller 110 turns the operation to step 804, otherwise the controller 110 returns the operation to step 801.

In step 804, the controller 110 waits for the one side sensing signal to cease, and turns the operation to step 805 after determining that the one side sensing signal has ceased.

In step 805, the controller 110 sends a handle deploying signal to the handle driving device 430, and then turns the operation to step 806.

In step 806, the handle driving device 430 drives the deploying of the handle, and then the controller 110 returns the operation to step 801.

In step 802, if the controller 110 determines that two side sensing signals are received, the controller turns the operation to step 807.

In step 807, the controller 110 determines whether the handle is at the deployed position, and if the handle is at the deployed position, the controller 110 turns the operation to step 808, otherwise the controller 110 returns the operation to step 801.

In step 808, the controller 110 waits for the two side sensing signals to cease, and turns the operation to step 809 after determining that the two side sensing signals have ceased.

In step 809, the controller 110 sends a handle retracting signal to the handle driving device 430, and then turns the operation to step 810.

In step 810, the handle driving device 430 drives the retracting of the handle, and then the controller 110 returns the operation to step 801.

As shown in FIG. 8B, for the embodiment shown in FIG. 4B/5B of indicating and controlling the deploying and retracting of the handle body by using one sensing circuit, one embodiment of the control flow 850 of the controller 110 is specifically described in the following.

In step 851, the controller 110 determines whether a sensing signal generated by the touch-slide type sensing circuit 313 is received, and if so, the controller 110 turns the operation to step 852, otherwise step 851 continues to be executed.

In step 852, the controller 110 determines whether the received sensing signal is a first-direction touch-slide sensing signal or a second-direction touch-slide sensing signal, and if it is the first-direction touch-slide sensing signal, the controller 110 turns the operation to step 853, and if it is the second-direction touch-slide sensing signal, the controller 110 turns the operation to step 857.

In step 853, the controller 110 determines whether the handle is at the retracted position, and if the handle is at the retracted position, the controller 110 turns the operation to step 854, otherwise the controller returns the operation to step 851.

In step 854, the controller 110 waits for the first-direction touch-slide sensing signal to cease, and turns the operation to step 855 after determining that the first-direction touch-slide sensing signal has ceased.

In step 855, the controller 110 sends a handle deploying signal to the handle driving device 430, and then turns the operation to step 856.

In step 856, the handle driving device 430 drives the deploying of the handle, and then the controller 110 returns the operation to step 851.

In step 852, if the controller 110 determines that the received signal is the second-direction touch-slide sensing signal, then the controller turns the operation to step 857.

In step 857, the controller 110 determines whether the handle is at the deployed position, and if the handle is at the deployed position, the controller 110 turns the operation to step 858, otherwise the controller 110 returns the operation to step 851.

In step 858, the controller 110 waits for the second-direction touch-slide sensing signal to cease, and turns the operation to step 859 after determining that the second-direction touch-slide sensing signal has ceased.

In step 859, the controller 110 sends a handle retracting signal to the handle driving device 430, and then turns the operation to step 860.

In step 860, the handle driving device 430 drives the retracting of the handle, and then the controller 110 returns the operation to step 851.

Figure 9A:
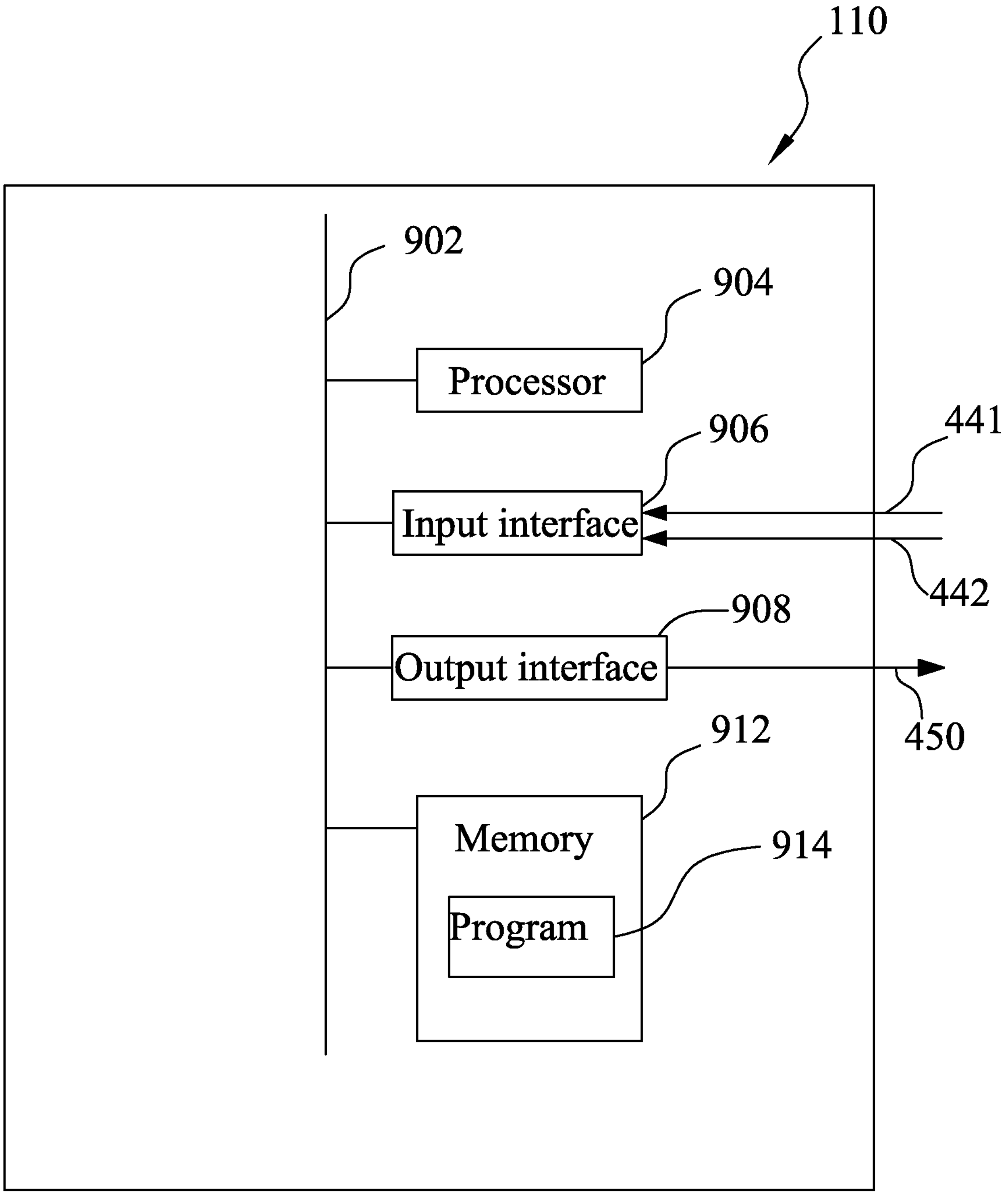
FIG. 9A is a block diagram illustrating functional modules according to one embodiment of the controller in the embodiment of FIG. 4A/5A.
Figure 9B:
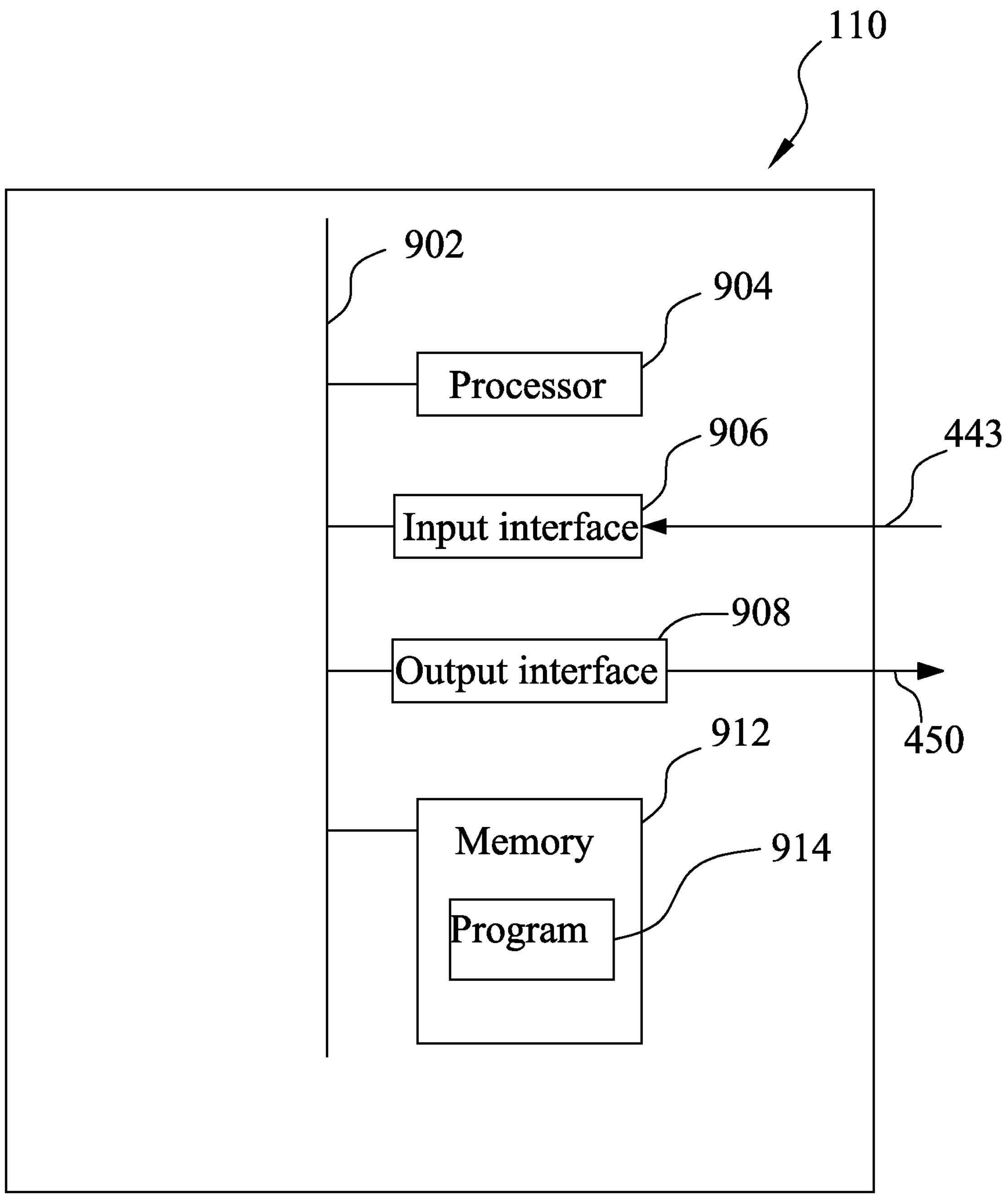
FIG. 9B is a block diagram illustrating functional modules according to one embodiment of the controller in the embodiment of FIG. 4B/5B.

FIG. 9A is a block diagram illustrating functional modules according to one embodiment of the controller 110 in the embodiment of FIG. 4A/4B. FIG. 9B is a block diagram illustrating functional modules according to one embodiment of the controller 110 in the embodiment of FIG. 4B/5B.

As shown in FIG. 9A, for the embodiment shown in FIG. 4A/5A of indicating and controlling the deploying and retracting of the handle body by using two sensing circuits, the controller 110 can comprise a processor 904, a memory 912, an input interface 906, an output interface 908 and a bus 902, and realize data transmission among the processor 904, the memory 912, the input interface 906 and the output interface 908 via the bus 902. The input interface 906 receives sensing signals (the outer-side sensing signal and the inner-side sensing signal) from the touch sensing device 105 via the connections 441 and 442, and then the processor 904 generates corresponding control instructions (including a control instruction for deploying a handle or retracting a handle, and a control instruction for locking a vehicle door lock, etc.) based on programs or instructions 914 (including a program or instruction that implements the control flow 800 as shown in FIG. 8A) pre-stored in the memory 912. The output interface 908 sends, to the handle driving device 430, a control instruction via the connection 450 that is generated by the processor 904 for deploying the handle or retracting the handle, thereby controlling the handle driving device 430 so that the same drives the deploying or retracting of the handle body 101. The output interface 908 also sends the corresponding control instruction to other operational components (e.g. a vehicle door) of the vehicle, so as to perform other operations on the vehicle (e.g. locking the vehicle door).

As shown in FIG. 9B, for the embodiment shown in FIG. 4B/5B of indicating and controlling the deploying and retracting of the handle body by using one sensing circuit, the controller 110 can comprise a processor 904, a memory 912, an input interface 906, an output interface 908 and a bus 902, and realize data transmission among the processor 904, the memory 912, the input interface 906 and the output interface 908 via the bus 902. The input interface 906 of the controller 110 receives sensing signals (the first-direction touch-slide sensing signal and the second-direction touch-slide sensing signal) from the touch sensing device 105 via the connection 443, and then the processor 904 generates corresponding control instructions (including a control instruction for deploying a handle or retracting a handle, and a control instruction for locking a vehicle door lock, etc.) based on programs or instructions 914 (including a program that implements the control flow 850 as shown in FIG. 8B) pre-stored in the memory 912. The output interface 908 sends, to the handle driving device 430, a control instruction via the connection 450 that is generated for deploying the handle or retracting the handle, thereby controlling the handle driving device 430 so that the same drives the deploying or retracting of the handle body 101. The output interface 908 also sends the corresponding control instruction to other operational components (e.g. a vehicle door) of the vehicle, so as to perform other operations on the vehicle (e.g. locking the vehicle door).

It needs to be noted that the handle body of the present disclosure is not limited to be of the specific structure and to be at the specific deployed position, retracted position and release position in the embodiments shown in FIGS. 1A-3B, and the handle control system and its corresponding control method according to the present disclosure can be used as long as the handle body can be moved away from a hidden position (that is, the position where the handle body is flush with the vehicle door) and return to the hidden position. For example, the deployed position of the handle body of the present disclosure may be a position where the handle body is rotated outward around a shaft from a hidden position by a certain angle, the release position thereof may be a position where the handle body continues to rotate outward from the deployed position by a certain angle, and the retracted position thereof is the hidden position of the handle body. The handle body in such an embodiment is similar to the handle body in the Chinese patent application no. 201711423248.9, entitled "Hidden type handle assembly", and filed by the applicant on Dec. 25, 2017.

The handle system and the control method provided in the present disclosure facilitate the user in controlling a vehicle by means of touch sensing. For example, by lightly touching a certain region by hand or drawing a certain pattern, the vehicle can be controlled and operated accordingly. The handle system and the operation method thereof according to the present disclosure require smaller operation strength, and are more flexible and convenient, and also more durable than the conventional button control manner. Moreover, compared to the long-distance sensing-controlled handle, the handle system and the operation method thereof according to the present disclosure are less prone to errors, and can ensure the touch feel desired by a user.

This description uses examples to disclose the present disclosure, in which one or more examples are illustrated in the drawings. Each example is provided to explain the present disclosure but is not intended to limit the present disclosure. In fact, it would have been obvious to those skilled in the art that various modifications and variations can be made to the present disclosure without departing from the scope or spirit of the present disclosure. For example, the illustrated or described features as part of one embodiment can be used with another embodiment to provide a further embodiment. Thus, it is intended that the present disclosure cover the modifications and variations made within the scope of the appended claims and their equivalents.

We claim:

1. A handle system for a vehicle, comprising:

a handle body with an outer-side surface and an inner-side surface that is configured to be oriented into a deployed position and a retracted position;

a handle driving device configured to move the handle body from the deployed position to the retracted position and from the retracted position to the deployed position, and a touch sensing device having a controller, connected to the handle body, configured to produce a first control signal or a second control signal, and being capable of generating a first sensing signal in response to a touch on the outer-side surface, and a second sensing signal in response to a touch on the inner-side surface, wherein when the handle body is in the retracted position and the first sensing signal is generated, the controller produces the first control signal and the handle driving device moves the handle body from the retracted position to the deployed position, and when the first sensing signal and the second sensing signal are both generated and then cease, the controller produces the second control signal and the handle driving device moves the handle body to the retracted position.

2. The handle system according to claim 1, wherein:

the controller is communicatively connected to the outer-side surface to receive the first sensing signal.

3. The handle system according to claim 1, wherein:

the second control signal initiates the locking of a vehicle door.

4. The handle system according to claim 1, wherein the touch sensing device comprises:

an outer-side sensing circuit configured to generate the first sensing signal in response to a touch action on the outer-side surface of the handle body; and an inner-side sensing circuit configured to generate the second sensing signal in response to a touch action on the inner-side surface of the handle body.

5. The handle system according to claim 4, wherein:

the handle driving device includes a motor that is configured to drive the handle body from the deployed position to the retracted position when the first sensing signal and the second sensing signal are received and then the first sensing signal and the second sensing signal cease.

6. The handle system according to claim 4, wherein:

the outer-side sensing circuit comprises a first capacitive sensor, a first measurement circuit, a first comparison circuit, and a first processor connected in sequence, the first capacitive sensor is capable of generating a change in capacitance in response to a touch on the outer-side surface of the handle body, the first measurement circuit is configured to generate a first electrical signal according to the change in capacitance of the first capacitive sensor, the first comparison circuit is configured to compare the first electrical signal with a preset first threshold to generate a first comparison signal, the first processor is configured to generate the first sensing signal according to the first comparison signal, the inner-side sensing circuit comprises a second capacitive sensor, a second measurement circuit, a second comparison circuit, and a second processor connected in sequence, the second capacitive sensor is capable of generating a change in capacitance in response to a touch on the inner-side surface of the handle body, the second measurement circuit is configured to generate a second electrical signal according to the change in capacitance of the second capacitive sensor, the second comparison circuit is configured to compare the second electrical signal with a preset second threshold to generate a second comparison signal, and the second processor is configured to generate the second sensing signal according to the second comparison signal.

7. The handle system according to claim 4, wherein the touch sensing device further comprises:

a touch-slide sensing circuit configured to generate touch-slide sensing signals;

a first filter circuit and a second filter circuit configured to perform filter processing on the first sensing signal and the second sensing signal.

8. The handle system according to claim 1, wherein:

the handle body is configured to only expose the outer-side surface outside a body of the vehicle when the handle body is oriented in the retracted position.

9. The handle system according to claim 1, wherein:

the handle body is further configured to be oriented into a release position; and a reset structure is configured to bias the handle body to the deployed position when the handle body is in the release position.

10. The handle system according to claim 9, wherein:

the reset structure comprises a spring.

11. The handle system according to claim 9, wherein:

the outer surface of the handle body in the deployed position is linearly displaced from the outer surface of the handle body in the retracted position.

12. The handle system according to claim 9, wherein:

the outer surface of the handle body in the release position is rotated with respect to the orientation of the outer surface of the handle body in the retracted position.

13. A method for controlling or operating a handle body of a vehicle, comprising the following steps:

providing an outer-side sensor at an outer-side surface of the handle body;

providing an inner-side sensor at an inner-side surface of the handle body;

generating an outer-side sensing signal when the outer-side surface of the handle body is touched;

providing a controller communicatively coupled to a handle driving device and the outer-side sensing signal;

generating a first control signal when the outer-side sensing signal is generated;

providing a vehicle door with an exterior surface;

providing the handle body in a retracted position wherein the outer-side surface is flush with the exterior surface, driving the handle body via a handle driving device to a deployed position wherein the outer-side surface is parallel to the exterior surface, and activating the vehicle when the outer-side sensing signal is generated;

generating an inner-side sensing signal when the inner-side surface of the handle body is touched, the outer-side sensing signal and the inner-side sensing signal ceasing when the handle body is released; and moving the handle body to the retracted position and locking the vehicle door when the outer-side sensing signal and the inner-side sensing signal cease.

14. The method according to claim 13, further comprising the following step:

orienting the handle body into a release position by rotating the handle body when in the deployed position.

15. The method according to claim 14, further comprising the following step:

providing a reset structure that biases the handle body to the deployed position when oriented in the release position.

16. The method according to claim 15, further comprising the following step:

providing the reset structure with a spring, and providing the handle driving device with a motor.

17. The method according to claim 16, further comprising the following step:

positioning the handle body such that the inner-side surface is closer to the exterior surface than the outer-side surface when the handle body is in the deployed position.

* * * * *